United States Patent
Seno et al.

(10) Patent No.: US 12,008,702 B2
(45) Date of Patent: Jun. 11, 2024

(54) INFORMATION PROCESSING DEVICE, INFORMATION PROCESSING METHOD, AND PROGRAM

(71) Applicant: SONY GROUP CORPORATION, Tokyo (JP)

(72) Inventors: Takashi Seno, Tokyo (JP); Yohsuke Kaji, Chiba (JP); Tomoya Ishikawa, Ibaraki (JP); Gaku Narita, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 309 days.

(21) Appl. No.: 17/604,178

(22) PCT Filed: Mar. 4, 2020

(86) PCT No.: PCT/JP2020/009155
§ 371 (c)(1),
(2) Date: Oct. 15, 2021

(87) PCT Pub. No.: WO2020/217727
PCT Pub. Date: Oct. 29, 2020

(65) Prior Publication Data
US 2022/0215609 A1    Jul. 7, 2022

(30) Foreign Application Priority Data
Apr. 22, 2019   (JP) ................... 2019-080690

(51) Int. Cl.
*G06T 13/80* (2011.01)
*G06T 1/00* (2006.01)
(Continued)

(52) U.S. Cl.
CPC ............ *G06T 13/80* (2013.01); *G06T 1/0014* (2013.01); *G06T 11/00* (2013.01); *G06T 13/40* (2013.01)

(58) Field of Classification Search
CPC ....... G06T 13/80; G06T 1/0014; G06T 11/00; G06T 13/40; G06T 7/292; G06T 7/246;
(Continued)

(56) References Cited

U.S. PATENT DOCUMENTS 8,988,437 B2 * 3/2015 Geisner ................... G06T 13/80
  345/475
9,155,967 B2 * 10/2015 Koganezawa ...... A63F 13/5255
(Continued)

FOREIGN PATENT DOCUMENTS

| JP | 2005-071265 A | 3/2005 |
| JP | 2009-134394 A | 6/2009 |

(Continued)

*Primary Examiner* — Abderrahim Merouan
(74) *Attorney, Agent, or Firm* — Paratus Law Group, PLLC

(57) ABSTRACT

A configuration that causes an agent such as a character in a virtual world or a robot in the real world to perform actions by imitating actions of a human is to be achieved. An environment map including type and layout information about objects in the real world is generated, actions of a person acting in the real world are analyzed, time/action/environment map correspondence data including the environment map and time-series data of action analysis data is generated, a learning process using the time/action/environment map correspondence data is performed, an action model having the environment map as an input value and a result of action estimation as an output value is generated, and action control data for a character in a virtual world or
(Continued)

a robot is generated with the use of the action model. For example, an agent is made to perform an action by imitating an action of a human.

13 Claims, 19 Drawing Sheets

(51) Int. Cl.
  *G06T 11/00* (2006.01)
  *G06T 13/40* (2011.01)
(58) Field of Classification Search
  CPC ... G06T 7/73; G06T 7/70; G06T 2207/30241; G06T 2207/10016; G06T 2207/30232; G06T 2207/20081; G06T 2207/30201; G06T 2207/30264; G06V 20/54; G06V 10/25; G06V 20/584; G06V 10/147; G06V 20/52; G06V 40/20; G06V 10/82; G06V 10/764; G06V 10/255; G06V 10/7625; G06V 20/625; G06V 2201/08; G06F 18/231; G06F 18/24143; H04N 23/90

See application file for complete search history.

(56) References Cited

U.S. PATENT DOCUMENTS

| | | | |
|---|---|---|---|
| 10,068,375 B2* | 9/2018 | Tanaka | G06T 19/006 |
| 2008/0100620 A1* | 5/2008 | Nagai | A63F 3/00643 345/424 |
| 2019/0291277 A1* | 9/2019 | Oleynik | B25J 9/1669 |
| 2019/0294869 A1* | 9/2019 | Naphade | G06V 20/54 |
| 2021/0294414 A1* | 9/2021 | Nomura | G05D 1/0223 |
| 2022/0131914 A1* | 4/2022 | Lavie | G06T 7/70 |
| 2022/0215609 A1* | 7/2022 | Seno | G06T 1/0014 |

FOREIGN PATENT DOCUMENTS

| | | |
|---|---|---|
| JP | 2017-204085 A | 11/2017 |
| JP | 2018-529298 A | 10/2018 |
| WO | WO 2013/038923 A1 | 3/2013 |

* cited by examiner

FIG. 6

(TIME-SERIES DATA 1) TIME-SERIES ACTION DATA

| TIME | ACTION TYPE | ACTION PARAMETERS | | |
|------|-------------|-------------------|---|---|
| t1 | an | V_an (SPEED) | P_an (POSITION) | .. |
| .. | .. | .. | .. | .. |

(TIME-SERIES DATA 2) TIME-SERIES ENVIRONMENT MAP CHANGE DATA

| TIME | OBJECT IDENTIFIER | OBJECT CHANGE PARAMETERS | | |
|------|-------------------|--------------------------|---|---|
| t1 | On | v_on (SPEED) | m_on (POSITION) | .. |
| .. | .. | .. | .. | .. |

FIG. 7

(CONSTANT DATA 1) ACTION ACQUISITION TARGET CONSTANT DATA

| ACTION ACQUISITION TARGET | PARAMETERS | | | |
|---|---|---|---|---|
| | L_ha (HEIGHT) | P_ha (BODY-BUILD) | : | : |
| PERSON A | | | | |
| : | | | | |

(CONSTANT DATA 2) ENVIRONMENT MAP CORRESPONDENCE CONSTANT DATA

| ENVIRONMENT MAP IDENTIFIER | OBJECT CORRESPONDENCE PARAMETERS | | |
|---|---|---|---|
| | k_o (OBJECT TYPE) | p_o (OBJECT POSITION) | : |
| m1 | | | |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2020/009155 (filed on Mar. 4, 2020) under 35 U.S.C. § 371, which claims priority to Japanese Patent Application No. 2019-080690 (filed on Apr. 22, 2019), which are all hereby incorporated by reference in their entirety.

TECHNICAL FIELD

The present disclosure relates to an information processing device, an information processing method, and a program. More particularly, the present disclosure relates to an information processing device, an information processing method, and a program for causing an agent, such as a character that is a virtual object that is used in AR content or the like, or a robot that is used in the actual world, to perform actions similar to those of an action object (a human or the like) in the real world.

BACKGROUND ART

An image in which a virtual object is superimposed and displayed on a camera-captured image of a real space is called an augmented reality (AR) image.

In content or a game using AR images, for example, virtual objects that move like a human, or characters, are often used.

For example, a character in content or a game is made to move like a person, so that the character can be made more realistic.

In the present disclosure, a target that is made to perform a motion or an action by imitating an action object (such as a human) in the real world is referred to as an agent. For example, a character or a robot is referred to as an agent.

The character may be an animation character in an AR image, for example. The robot is a robot that moves in the real world, or specifically, is a robot that works in place of a human, such as a cooking robot, a nursing care robot, and a housekeeping robot.

To make a character in an AR image realistic, for example, it is necessary for the character to act naturally. If a character moves unnaturally in a non-human manner, the character becomes less realistic.

Patent Document 1 (Japanese Patent Application Laid-Open No. 2009-134394) and Patent Document 2 (JP 2018-529298 W) are examples of conventional technologies that disclose techniques for causing a character to perform human-like actions.

Patent Document 1 (Japanese Patent Application Laid-Open No. 2009-134394) discloses a configuration in which a teacher agent to be an action learning target is selected from a plurality of agents (characters) in a virtual space, actions of the teacher agent are learned, and actions of another agent of interest are controlled with the result of the learning.

That is, actions of a first character are reflected by a second character.

However, this configuration is a configuration in which the learning target is an agent (character) in a virtual space, not a human in the real world, and the agent (character) in the virtual space cannot be made to perform actions similar to those of a human.

In the disclosed configuration of this document, interactions between an agent (character) and an object in a virtual space are limited to actions conceivable in the virtual space, for example. For example, to learn an action of opening the lid of a plastic bottle, a teacher agent (character) that performs the lid opening action is necessary.

A human acts in various manners, and it is difficult to generate a perfect teacher agent (character) taking into consideration all human actions. Therefore, processes that can be performed by this configuration are limited.

Patent Document 2 (JP 2018-529298 W) discloses a system that simulates control actions similar to those of a human.

This document discloses a configuration for compressing high-dimensional environment data into a low-dimensional human decision-making map. For example, this document discloses a system that receives an input of an environmental context that is ambient environment information acquired with a camera or a sensor, and outputs data of decision-making similar to that of a human.

This document discloses a configuration for generating a model for inferring how human decision-making is performed in accordance with the environment during a car ride.

For example, the configuration is for generating a model including a mental imagery evaluation for the sound of the car, parameters such as a speed and an acceleration of the car, a speed change during driving with respect to a scheduled time at which the car will arrive at a destination, and the like.

This configuration uses an environmental context as an input and data of decision-making similar to that of a human as an output, and is not a technology that can be used in a process of making actions of an agent (character) in a virtual space of AR content similar to those of a human.

CITATION LIST

Patent Documents

Patent Document 1: Japanese Patent Application Laid-Open No. 2009-134394
Patent Document 2: JP 2018-529298 W

SUMMARY OF THE INVENTION

Problems to be Solved by the Invention

The present disclosure aims to provide an information processing device, an information processing method, and a program for causing an agent, such as a character that is a virtual object that is used in AR content or the like, or a robot that is used in the actual world, to perform actions similar to those of an action object (a human or the like) in the real world.

Solutions to Problems

A first aspect of the present disclosure lies in an information processing device that includes:
  a data recording unit that generates an environment map including type and layout information about an object in the real world, generates action analysis data of an action object that acts in the real world, and generates time/action/environment map correspondence data including the environment map and time-series data of the action analysis data;

an action learning unit that performs a machine learning process using the time/action/environment map correspondence data, and generates an action model having the environment map as an input value and a result of action estimation as an output value; and an agent action generating unit that generates action control data for an agent, using the action model, the agent being a character in a virtual world or a robot.

Further, a second aspect of the present disclosure lies in an information processing method that is implemented in an information processing device, the information processing method including performing:

by a data processing unit, a process of generating an environment map including type and layout information about an object in a real world, generating action analysis data of an action object that acts in the real world, and generating time/action/environment map correspondence data including the environment map and time-series data of the action analysis data;

a process of performing a machine learning process using the time/action/environment map correspondence data, and generating an action model having the environment map as an input value and a result of action estimation as an output value; and a process of generating action control data for an agent, using the action model, the agent being a character in a virtual world or a robot.

Further, a third aspect of the present disclosure lies in a program for information processing in an information processing device, the program causing a data processing unit to perform:

a process of generating an environment map including type and layout information about an object in a real world, generating action analysis data of an action object that acts in the real world, and generating time/action/environment map correspondence data including the environment map and time-series data of the action analysis data;

a process of performing a machine learning process using the time/action/environment map correspondence data, and generating an action model having the environment map as an input value and a result of action estimation as an output value; and a process of generating action control data for an agent, using the action model, the agent being a character in a virtual world or a robot.

Note that the program of the present disclosure is a program that can be provided in a computer-readable format from a storage medium or a communication medium to an information processing device or a computer system that can execute various program codes, for example. As such a program is provided in a computer-readable format, processes according to the program are performed in an information processing device or a computer system.

Other objects, features, and advantages of the present disclosure will be made apparent by the embodiments of the present disclosure described below and the detailed descriptions with reference to the accompanying drawings. Note that, in this specification, a system is a logical assembly of a plurality of devices, and does not necessarily mean devices with the respective components incorporated into the same housing.

With the configuration of an embodiment of the present disclosure, an agent such as a character in a virtual world or a robot in the real world can be made to perform actions by imitating actions of a human.

Specifically, for example, an environment map including type and layout information about objects in the real world is generated, actions of a person acting in the real world are analyzed, time/action/environment map correspondence data including the environment map and time-series data of action analysis data is generated, a learning process using the time/action/environment map correspondence data is performed, an action model having the environment map as an input value and a result of action estimation as an output value is generated, and action control data for a character in a virtual world or a robot is generated with the use of the action model. For example, an agent is made to perform an action by imitating an action of a human.

With this configuration, an agent such as a character in a virtual world or a robot in the real world can be made to perform actions by imitating actions of a human.

Note that the advantageous effects described in this specification are merely examples, and the advantageous effects of the present technology are not limited to them and may include additional effects.

BRIEF DESCRIPTION OF DRAWINGS

FIG. 6 is a diagram for explaining an example of the configuration data of time/action/environment map correspondence data.

FIG. 7 is a diagram for explaining an example of the configuration data of time/action/environment map correspondence data.

MODE FOR CARRYING OUT THE INVENTION

Figure 1:
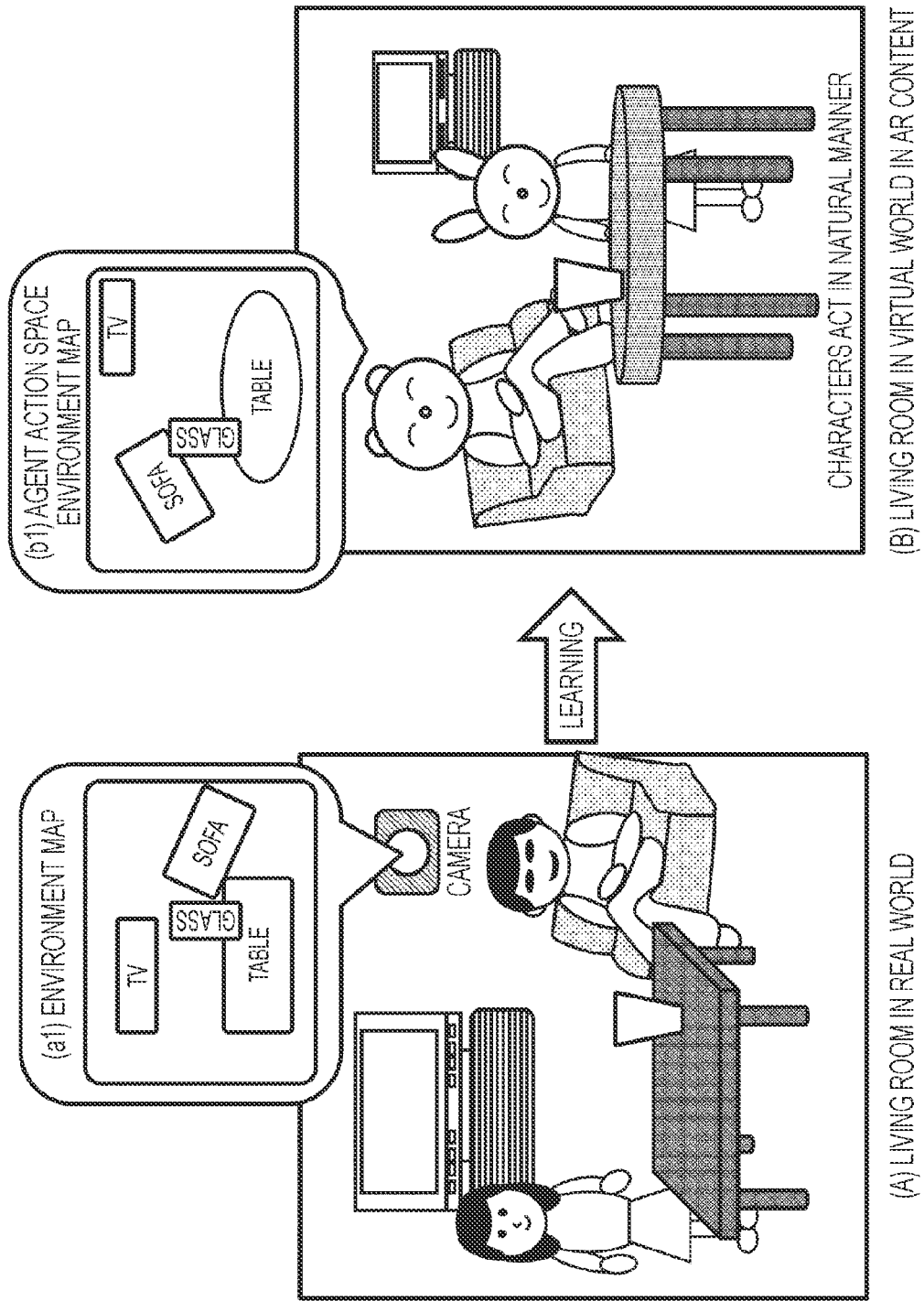
FIG. 1 is a diagram for explaining an outline of processes to be performed by an information processing device of the present disclosure.

The following is a detailed description of information processing devices, information processing methods, and programs of the present disclosure, with reference to the drawings. Note that explanation will be made in the following order.
1. Outline of processes to be performed by an information processing device of the present disclosure
2. Example configuration of an information processing device of the present disclosure and processes to be performed
3. Details of processes to be performed by the data processing unit of the information processing device
4. Specific example of character control in AR content by the information processing device of the present disclosure
5. Various example processes for which the information processing device of the present disclosure is used
6. Embodiment in which a plurality of action analysis targets and a plurality of agents are set
7. Embodiment that takes into account processes to be performed when an unanticipated action difficult to be analyzed is observed
8. Example control on an agent acting in the real world
9. Examples of a process of learning actions that are not of a person, and processes of generating and applying an action model
10. Example hardware configuration of an information processing device
11. Summary of the configuration of the present disclosure

[1. Outline of Processes to be Performed by an Information Processing Device of the Present Disclosure]

Referring first to FIG. 1, an outline of processes to be performed by an information processing device of the present disclosure is described.

An information processing device of the present disclosure enables a character that is a virtual object displayed in an image in which a virtual object is superimposed and displayed on a camera-captured image of a real space, which is a so-called augmented reality (AR) image, or an agent such as a robot that is used in the real world, to perform actions similar to those of an autonomous action object in the real world, such as a human.

As described above, in content or a game using AR images, many virtual objects that move like a human, or characters, are used, for example.

Further, the use of robots that work in place of humans, such as cooking robots, nursing care robots, and housekeeping robots, is also increasing these days.

In the present disclosure, a character in an AR image, or a robot or the like that acts in the real world, for example, is made to perform actions by imitating a living creature such as a human in the real world, or an autonomously moving action object.

In the present disclosure, a target that is made to perform a motion or an action by imitating an action object (such as a human) in the real world is referred to as an agent.

For example, a character in content or a game, and a robot that moves in the real world are called agents.

The character is an animation character in an AR image or the like, for example. The robot is a robot that moves in the real world, or specifically, is a robot that works in place of a human, such as a cooking robot, a nursing care robot, and a housekeeping robot.

The information processing device of the present disclosure causes such an agent to perform actions and movement similar to those of a human or the like in the real world.

In AR content and games using AR images, many agents (characters) that act autonomously are used. To make such agents realistic, the agents (characters) need to act naturally.

Particularly, in AR content, an agent (a character) that is a virtual object is superimposed and displayed in a real space as a camera-captured image of an actual space, for example, and thus, it is possible to enhance reality by causing a real object existing in the real space and the agent to have an interaction with natural motions similar to those in the real world.

Specific examples of interactions between a real object and an agent include the following:
(a) sitting on a chair, holding something, eating at a table, and the like (short-term actions); and
(b) going to the refrigerator to pick up a drink sometimes, going to the toilet, and the like (long-term actions).

Humans perform the above actions (a) and (b), and the information processing measures of the present disclosure enable an agent (a character) in AR content or a game, a robot that moves in the real world, or the like to perform actions similar to these actions.

The information processing device of the present disclosure performs the processes shown below, for example.

(Process 1) Environment data of a real space is acquired with a sensor such as a camera, and the layout and the types of real objects in the real space are detected, so that an "environment map" is generated.

The "environment map" is a map including information about the layout, the types, and the like of the real objects.

(Process 2) Actions including interactions between a living creature such as a human and the real objects are recorded and learned, so that an "action model" is generated.

The "action model" is a machine learning model having an environment map as an input value and an action estimation result as an output value. For example, the "action model" is a learning model including learned data about interactions between a human and a real object. Specifically, action information or the like obtained when a human faces a certain real object is recorded.

For example, the "action model" is a model including action data or the like of an action such as a person walking toward a chair and then sitting on the chair.

(Process 3) When a new environment map that is an environment map of the space in which the agent acts is provided with the use of the "environment map" and the "action model" generated in Processes 1 and 2 described above, a natural action of the agent in the agent action space is generated. A natural action of the agent is generated when the agent is made to perform an action estimated with the use of the "action model". As a result, the action of the agent is reproduced as an action imitating an action of a human in the real world, for example.

As an action of the agent is estimated and controlled with the use of the "environment map" and the "action model", actions including an interaction between the agent and an object in the agent action space can be estimated, for example, and actions of the agent with respect to the object in the agent action space can be generated (controlled).

The actions recorded in the above (Process 1) and reproduced and imitated in the agent in the above (Process 3) include not only elemental actions of an action object such as a person in the real world, but also time-series actions and long-term natural actions. The actions also include actions related to voice such as conversations and utterances.

Note that, as described above, an agent is a target that is made to perform motions and actions imitating an action object (a human or the like) in the real world, and specifically, is a character in content or a game, a robot that moves in the real world, or the like.

A new environment map is a map including object layout information about a space in AR content or a real space in which a robot acts, or an environment map of the agent action space. Note that objects are the objects in the space in which the agent acts, and include various objects such as a table, a chair, a glass, and a room, for example. The environment map includes layout information about these objects, the position of the table, layout information about the rooms, and the like.

FIG. 1 shows a specific example of processes to be performed by the information processing device of the present disclosure.

(A) living room in the real world shown in FIG. 1 is the actual world.

A process according to the above (Process 1) is performed with respect to the "(A) living room in the real world", and "(a1) environment map" is generated.

That is, environment data of "(A) living room in the real world", which is a real space, is acquired with a sensor such as a camera, and the layout and the types of real objects in the real space are detected. Thus, the "(a1) environment map" is generated.

Further, actions of the humans in the (A) living room in the real world shown in FIG. 1 are analyzed on the basis of information acquired with a sensor such as a camera, and (Process 2) described above is performed. Thus, an "action model" is generated.

That is, actions including interactions between the humans and the real objects in the "(A) living room in the real world" are recorded and learned, so that the "action model" is generated.

Lastly, (Process 3) described above is performed.

That is, with the use of the "environment map" and the "action model" generated in Processes 1 and 2 described above, natural actions of the agent (a character) are generated when a new environment map that is "(b1) agent action space environment map" indicating object layout in a living room of a virtual world in AR content shown in FIG. 1(B) is provided. Natural actions of the agent are generated by imitating actions of the "action model".

[2. Example Configuration of an Information Processing Device of the Present Disclosure and Processes to be Performed]

Next, an example configuration of an information processing device of the present disclosure and processes to be performed are described with reference to FIG. 2 and the drawings that follow.

Figure 2:
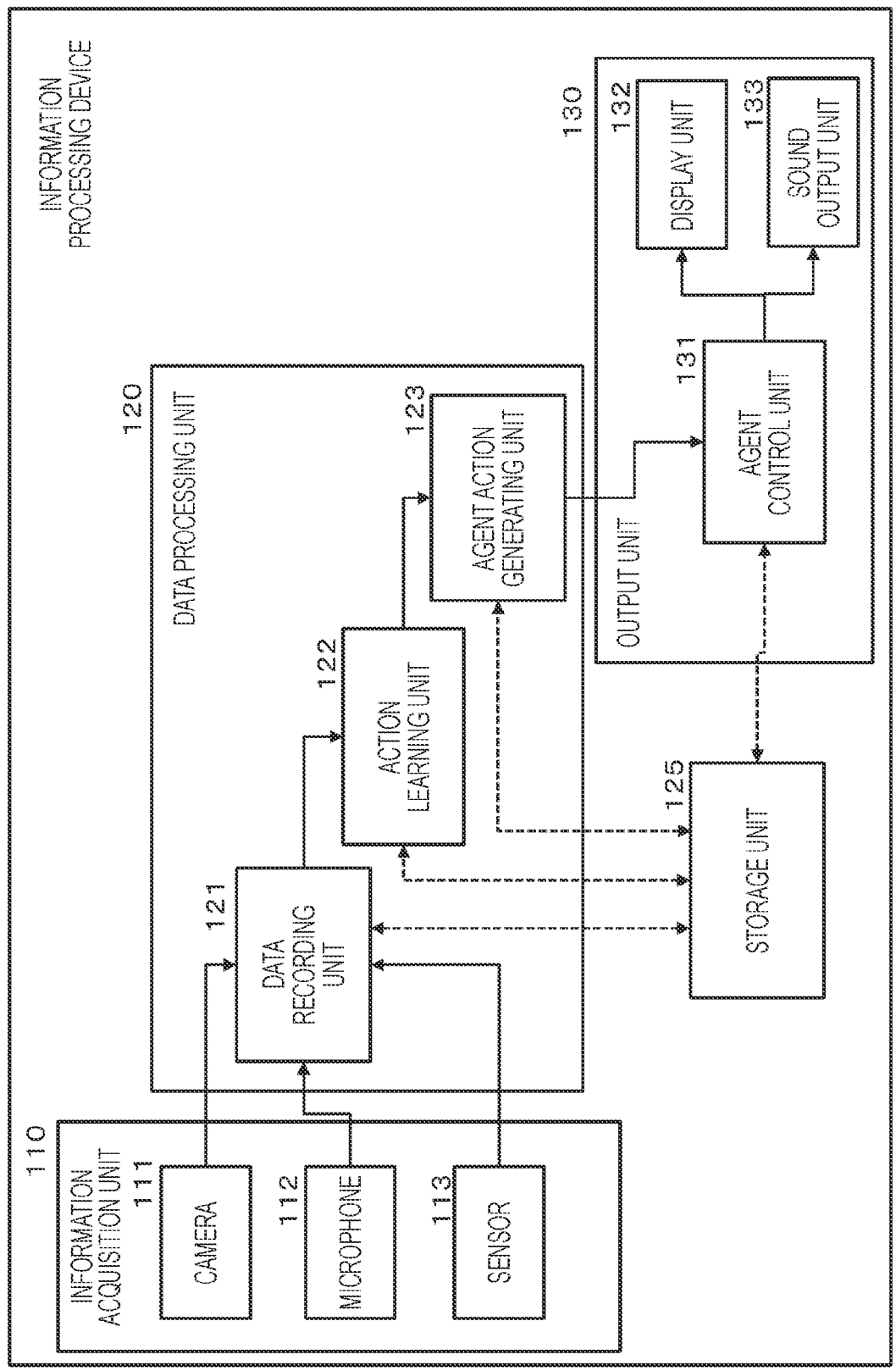
FIG. 2 is a block diagram showing an example configuration of the information processing device of the present disclosure.

FIG. 2 is a block diagram showing an example configuration of an information processing device 100 of the present disclosure.

As shown in FIG. 2, the information processing device 100 of the present disclosure includes an information acquisition unit 110, a data processing unit 120, a storage unit 125, and an output unit 130.

The information acquisition unit 110 acquires information about reality. The information acquisition unit 110 includes a camera 111 that captures an image, a microphone 112 that acquires voice information, and a sensor 113 that detects a position, movement, and the like of a person, a living creature, or some other object.

Note that the camera 111 is formed with a stereo camera capable of measuring the position of each object, for example. Meanwhile, the sensor 113 is formed with a plurality of sensor groups such as a distance measuring sensor and a motion sensor.

The data processing unit 120 includes a data recording unit 121, an action learning unit 122, and an agent action generating unit 123.

The data recording unit 121 receives an input of acquired information from the information acquisition unit 110, and generates time/action/environment map correspondence data.

The "time/action/environment map correspondence data" is data in which time, an action of a person or the like in the real world, and an environment map are recorded and associated with one another. Note that an environment map is data containing object types and layout information.

The process sequence to be performed by the data recording unit 121 to generate the "time/action/environment map correspondence data" will be described later.

The "time/action/environment map correspondence data" generated by the data recording unit 121 is stored into the storage unit 125. The "time/action/environment map correspondence data" generated by the data recording unit 121 is also input to the action learning unit 122 via the storage unit 125 or directly.

The action learning unit 122 receives an input of the "time/action/environment map correspondence data" generated by the data recording unit 121, and performs a process of learning (machine learning) actions of a person or the like in the actual world, to generate an action model (machine learning model).

When an environment map is provided, the "action model (machine learning model)" is a learning model for estimating an action of a real person or the like existing in the environment. Specifically, the action model is a learning model for generating an output indicating a predetermined action in response to a predetermined input such as:

input: "a person stands in front of a chair"
output: "a person sits on a chair", for example.

The process sequence to be performed by the action learning unit 122 to generate the "action model (machine learning model)" will be described later.

The "action model (machine learning model)" generated by the action learning unit 122 is stored into the storage unit 125. The "action model (machine learning model)" generated by the action learning unit 122 is also input to the agent action generating unit 123 via the storage unit 125 or directly.

The agent action generating unit 123 performs a process of generating an action of an agent such as a character or a robot of AR content. For example, agent action control data for controlling actions of a character in AR content or actions of a robot in the real world is generated.

The agent action generating unit 123 receives inputs of agent action space environment data indicating the environment of the agent action space in which a character in AR content or a robot acts and the "action model (machine learning model)" generated by the action learning unit 122, estimates an action determined to be performed by the agent, and generates "agent action control data" for causing the agent to act on the basis of the estimated action.

The process sequence to be performed by the agent action generating unit 123 to generate the "agent action control data" will be described later.

The "agent action control data" generated by the agent action generating unit 123 is stored into the storage unit 125. The "agent action control data" generated by the agent action generating unit 123 is also input to the output unit 130 via the storage unit 125 or directly.

The output unit 130 includes an output control unit 131, a display unit 132, and a sound output unit 133.

The output control unit 131 of the output unit 130 receives an input of the "agent action control data" generated by the agent action generating unit 123, and causes the agent to act in accordance with the "agent action control data" in the agent action space.

The display unit 132 is a display unit that displays an agent, such as an image of AR content, for example. The sound output unit 133 is a speaker that outputs sound of AR content.

On the display unit 132, an image of AR content as shown in FIG. 1(B) described above with reference to FIG. 1 is displayed, for example.

Note that the configuration of the output unit 130 of the information processing device 100 shown in FIG. 2 is an example configuration of an output unit when the agent performs action control on the character displayed in AR content.

Figure 3:
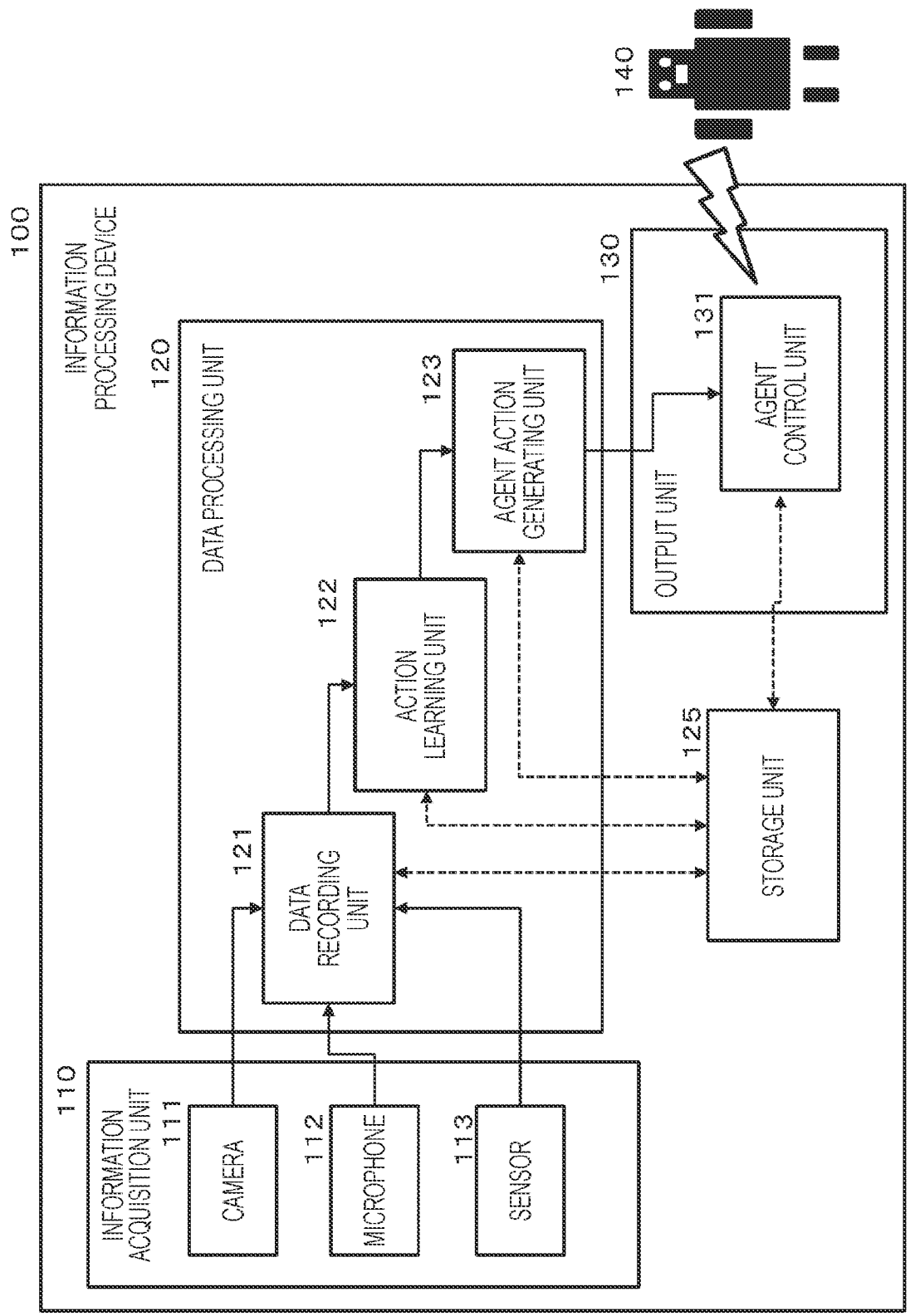
FIG. 3 is a block diagram showing an example configuration of the information processing device of the present disclosure.

When the agent is a robot that acts in the real space, the configuration of the output unit 130 of the information processing device 100 is as shown in FIG. 3.

The output unit 130 of the information processing device 100 shown in FIG. 3 includes an agent control unit 131.

The agent control unit 131 receives an input of the "agent action control data" generated by the agent action generating unit 123, and functions as a robot controller that causes a robot as the agent to act in accordance with the "agent action control data" in the agent action space, which is the agent action space in which a robot 140 acts.

[3. Details of Processes to be Performed by the Data Processing Unit of the Information Processing Device]

Figure 4:
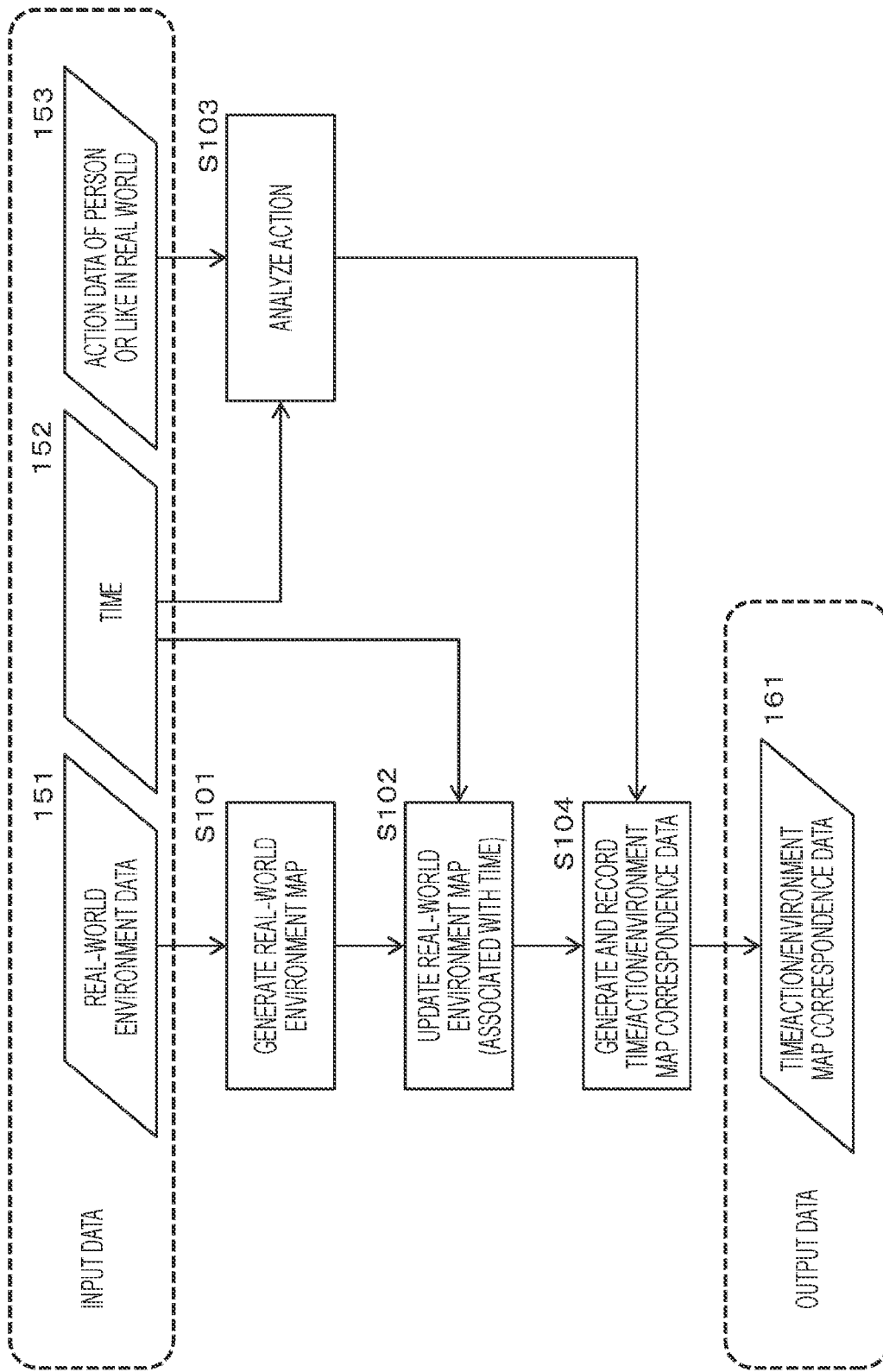
FIG. 4 is a diagram specifically showing processes to be performed by a data recording unit of a data processing unit of the information processing device.

Next, processes to be performed by the respective components of the data processing unit 120 of the information processing device 100 shown in FIGS. 2 and 3, which are the respective processing units of the data recording unit 121, the action learning unit 122, and the agent action generating unit 123, are described in detail, with reference to FIG. 4 and the drawings that follow.

(3-1. Details of Processes to be Performed by the Data Recording Unit)

First, processes to be performed by the data recording unit 121 of the data processing unit 120 of the information processing device 100 shown in FIGS. 2 and 3 are described in detail, with reference to FIG. 4.

As described above, the data recording unit 121 receives an input of information acquired by the information acquisition unit 110, and generates time/action/environment map correspondence data.

The "time/action/environment map correspondence data" is data in which time, an action of a person or the like in the real world, and an environment map are recorded and associated with one another. Note that an environment map is data containing object types and layout information.

FIG. 4 is a flowchart for explaining the process sequence to be performed by the data recording unit 121 to generate the "time/action/environment map correspondence data".

Note that the processes according to the flowchart described below can be performed according to a program stored in the storage unit of the information processing device 100, for example. For example, the processes can be performed as program execution processes by a processor such as a CPU having a program execution function.

As shown in FIG. 4, the data recording unit 121 receives an input of each piece of the following data as input data:
 (a) real-world environment data 151;
 (b) time 152; and
 (c) action data 153 of a person or the like in the real world.

The (a) real-world environment data 151 and the (c) action data 153 of a person or the like in the real world are information acquired by the camera 111, the microphone 112, and the sensor 113, which constitute the information acquisition unit 110 described above with reference to FIG. 2.

The (b) time 152 is acquired from a clock in the information processing device 100.

The (a) real-world environment data 151 is image data and the like of various real objects acquired by the camera 111 or the sensor 113, for example.

Note that the camera 111 or the sensor 113 also acquires object shape data required for a semantic segmentation process that is an algorithm for determining the shape and type of an object, for example.

Semantic segmentation is a technique for identifying an object in an image. Semantic segmentation is a technique for determining to which object category each of the pixels constituting an image belongs, on the basis of the degree of coincidence between object identification dictionary data (learned data) in which shape information and other feature information about various actual objects are registered, and an object in the image.

The (c) action data 153 of a person or the like in the real world is also data acquired by the camera 111 or the sensor 113, for example.

The sensor 113 includes a motion capture sensor, and acquires various kinds of motion information about a person (a living creature) in the real world.

The data recording unit 121 receives an input of each piece of the following data:
 (a) real-world environment data 151;
 (b) time 152; and
 (c) action data 153 of a person or the like in the real world,
 and generates time/action/environment map correspondence data 161 as output data.

Each processing step to be carried out by the data recording unit 121 as shown in the flowchart in FIG. 4 is now described.

(Step S101)

First, in step S101, the data recording unit 121 generates a real-world environment map.

The real-world environment map is generated with the use of the "(a) real-world environment data 151", which is input data.

The real-world environment map is data including the positions and type information about real-world objects. Semantic segmentation described above can be used in the process of generating the real-world environment map, for example.

(Step S102)

Next, in step S102, the data recording unit 121 performs a process of updating the real-world environment map.

On the basis of the time 152 acquired from the clock in the information processing device 100, the real-world environment map and the time are associated with each other, and the process moves on to the next step S104.

Note that the real-world environment data 151 as input data is continuously input, and the eventually generated "time/action/environment map correspondence data" is generated as time-series data corresponding to each time.

Figure 5:
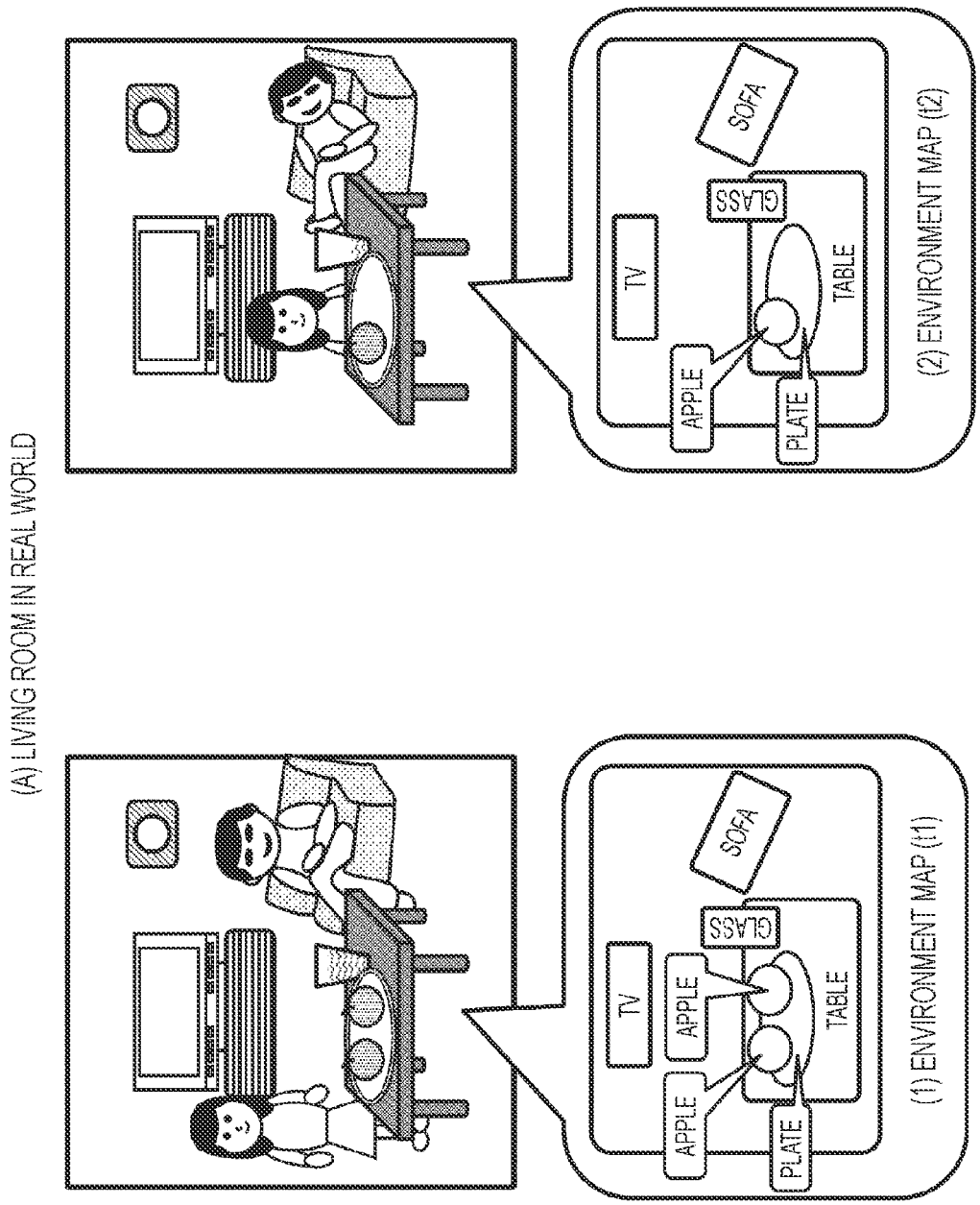
FIG. 5 is a diagram for explaining a specific example of a time-series environment map generated by the data recording unit.

In step S102, time-series environment maps are sequentially generated. For example, as shown in FIG. 5, the environment map of the respective time units of times (t1), (t2), . . . , including:

(1) environment map (t1); and
(2) environment map (t2).

These environment maps at the respective times are sequentially generated.

(Step S103)

Step S103 is a step of performing an action analysis process.

In step S103, the data recording unit 121 receives inputs of the following pieces of data:

(b) time 152; and
(c) action data 153 of a person or the like in the real world.

By receives inputs of these pieces of data, the data recording unit 121 analyzes an action of a person or the like in the real world.

An action of a person or the like in the real world is analyzed on the basis of data acquired by the camera 111 or the sensor 113, for example. As described above, the sensor 113 includes a motion capture sensor, and the data recording unit 121 analyzes an action of a person (a living creature) in the real world, using these pieces of information.

(Step S104)

Lastly, in step S104, the data recording unit 121 generates time/action/environment map correspondence data, and records the data into the storage unit 125.

The data recording unit 121 generates time/action/environment map correspondence data, using the time-series data of the environment map generated in step S102, and the action analysis result generated in step S103.

As described above, "time/action/environment map correspondence data" is data in which time, an action of a person or the like in the real world, and an environment map are recorded and associated with one another. Note that an environment map is data containing object types and layout information.

As a result of these processes,

"time/action/environment map correspondence data 161", which is shown as the output data in FIG. 4, is generated.

An example of the time/action/environment map correspondence data 161 is now described, with reference to FIGS. 6 and 7.

The time/action/environment map correspondence data 161 includes these two kinds of data:

(a) time-series data; and
(b) constant data.

The time-series data includes data such as the data shown in FIG. 6, for example.

FIG. 6 shows two kinds of time-series data.

(Time-series data 1) is time-series action data, and is data in which time-series action information about an object that is an action observation target, such as a person in the real world, is recorded.

Times (t), action types (a), and action parameters (speed, position, and the like) are associated with one another, and are recorded.

Various kinds of actions, such as walking, sitting, running, standing, holding a cup, opening a refrigerator, and operating a TV remote controller, for example, are recorded as the action types.

Parameter for enabling reproduction of actions corresponding to these respective action types are recorded as the action parameters.

The types of action parameters vary depending on the action types.

(Time-series data 2) is time-series environment map change data, and is data in which time-series change information about the real-world environment map is recorded.

Times (t), object identifiers (m), and object change parameters (speed, position, and the like) are associated with one another, and are recorded.

The object identifiers (m) are identifiers of the respective objects (such as a table and a cup) included in the environment map, and change information about each object is recorded in the object change parameters (speed, position, and the like).

Note that the time-series data includes various data ranging from data having a long interval of time t to data having a short interval of time t. That is, time-series data corresponding to both short-term actions and long-term actions is recorded.

Further, the time/action/environment map correspondence data 161 is static data that is not time-series data. (b) Constant data is also included.

An example of (b) constant data is shown in FIG. 7.

(Constant data 1) shown in FIG. 7 is action acquisition target constant data, and constant data regarding an object that is an action acquisition target, such as a person or the like in the real world, is recorded.

Specifically, an action acquisition target=person A, parameters=information regarding the height and body-build of the person, and the like are associated with one another, and are recorded.

(Constant data 2) shown in FIG. 7 is environment map correspondence constant data, and constant data regarding various objects included in the real-world environment map is recorded.

Specifically, an environment map identifier, and object correspondence parameters such as the object types (table, sofa, cup, and the like) of the objects included in the environment map are associated with each other and are recorded.

The "time/action/environment map correspondence data 161" generated by the data recording unit 121 is stored into the storage unit 125. The "time/action/environment map correspondence data 161" is input to the action learning unit 122 via the storage unit 125 or directly.

(3-2. Details of a Process to be Performed by the Action Learning Unit)

Figure 8:
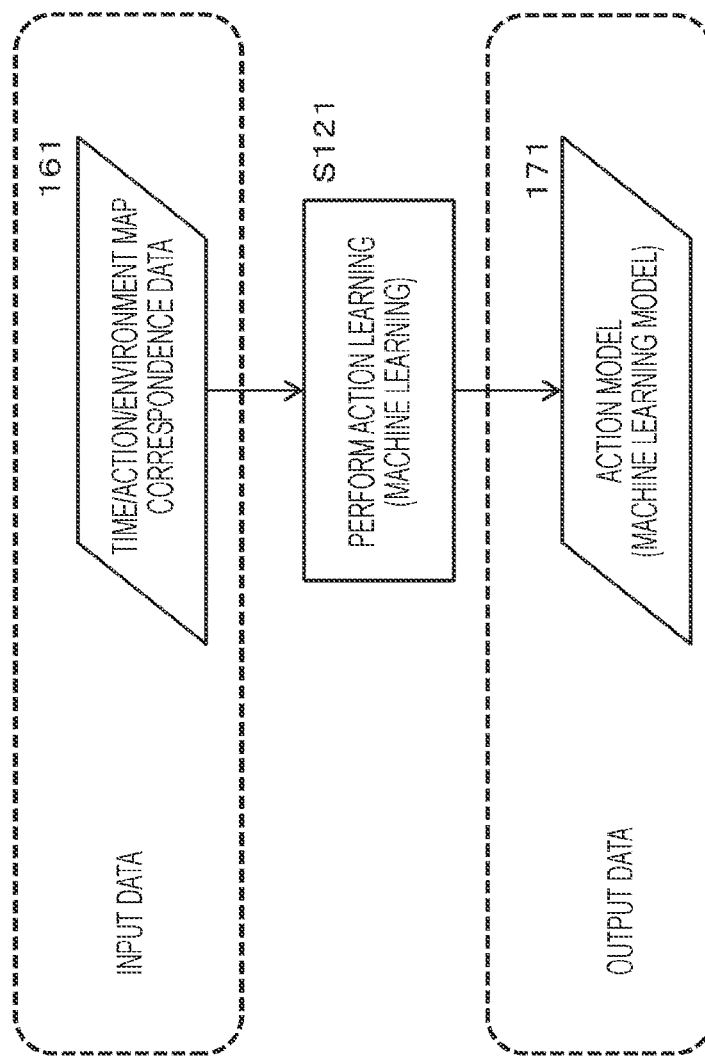
FIG. 8 is a diagram for specifically explaining a process to be performed by an action learning unit of the data processing unit of the information processing device.

Next, a process to be performed by the action learning unit 122 of the data processing unit 120 of the information processing device 100 shown in FIGS. 2 and 3 is described in detail, with reference to FIG. 8.

The action learning unit 122 receives an input of the "time/action/environment map correspondence data" generated by the data recording unit 121, and performs a process of learning (machine learning) actions of a person or the like in the actual world, to generate an action model (machine learning model).

An "action model (machine learning model)" is a machine learning model having an environment map as an input value and an action estimation result as an output value. For example, when an environment map is provided, the "action model (machine learning model)" is a learning model for estimating an action of a real person or the like existing in the environment.

As shown in FIG. 8, the action learning unit 122 receives an input of the following data as input data:

(a) time/action/environment map correspondence data 161.

The "time/action/environment map correspondence data 161" is data generated by the data recording unit 121, and is data in which time, an action of a person or the like in the real world, and an environment map are associated with one another and are recorded. Note that an environment map is data containing object types and layout information.

The action learning unit 122 receives an input of the "time/action/environment map correspondence data 161", and performs the process in step S121 described below.

(Step S121)

The action learning unit 122 receives an input of the "time/action/environment map correspondence data 161", and performs a process of learning (machine learning) actions of a person or the like in the real world, to generate an action model (machine learning model) in step S121.

When an environment map is provided, the "action model (machine learning model)" is a learning model for estimating an action of an action object existing in the environment, such as a person in the real world, for example.

Specifically, the action model is a learning model for generating an output indicating a predetermined action in response to a predetermined input such as:

input: "a person stands in front of a chair"
output: "a person sits on a chair", for example.

By causing an agent in a virtual space or a robot in the real world to perform an action estimated using this learning model, actions of an agent can be controlled to be actions similar to those of a person. That is, it is possible to cause an agent to perform an action that imitates a person's action.

As a result of the process in step S121,
the "action model (machine learning model) 171", which is shown as the output data in FIG. 8,
is generated.

This "action model (machine learning model)" generated by the action learning unit 122 is stored into the storage unit 125. The "action model (machine learning model)" generated by the action learning unit 122 is also input to the agent action generating unit 123 via the storage unit 125 or directly.

(3-3. Details of Processes to be Performed by the Agent Action Generating Unit)

Figure 9:
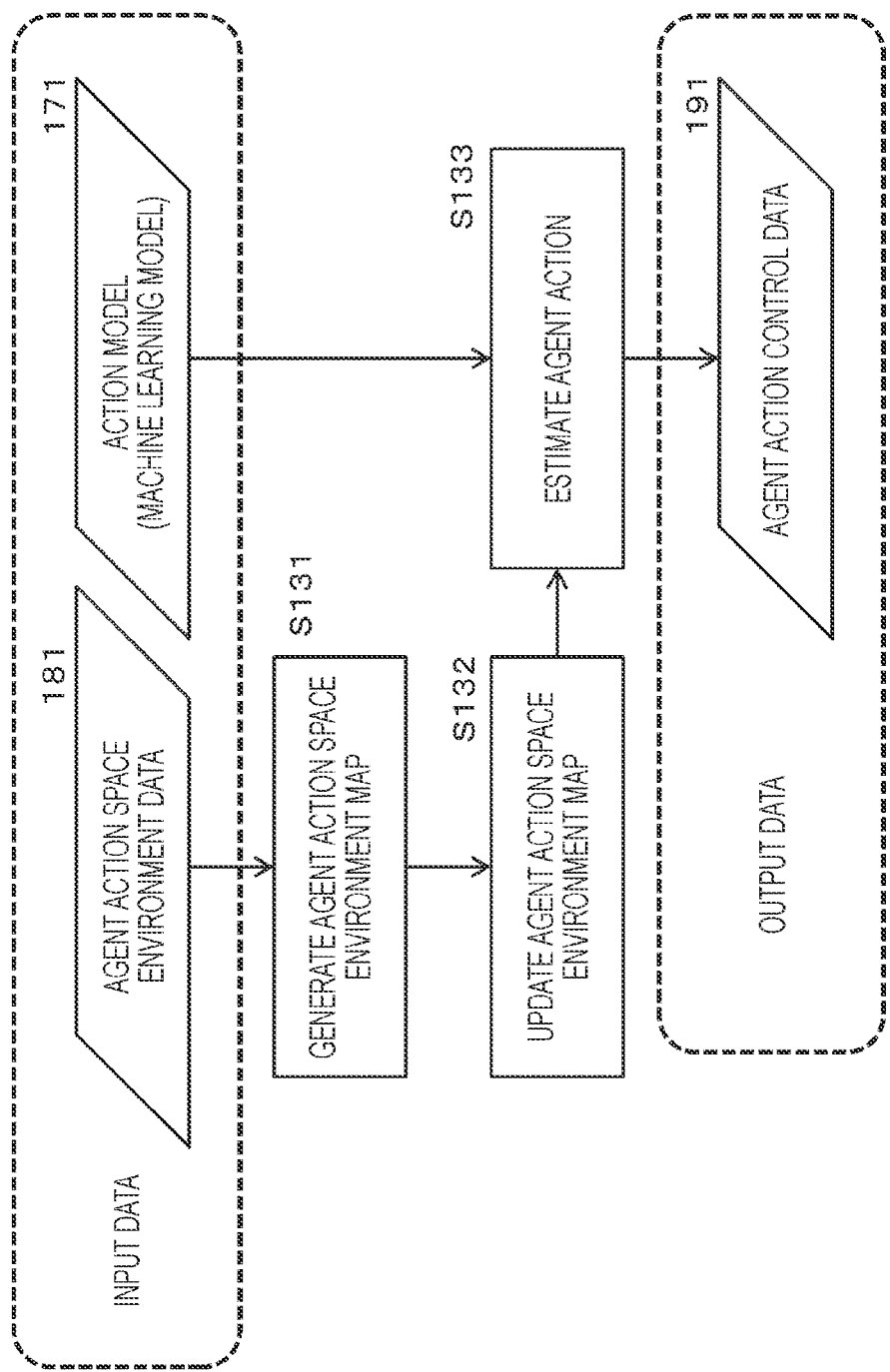
FIG. 9 is a diagram for specifically explaining processes to be performed by an agent action generating unit of the data processing unit of the information processing device.

Next, processes to be performed by the agent action generating unit 123 of the data processing unit 120 of the information processing device 100 shown in FIGS. 2 and 3 are described in detail, with reference to FIG. 9.

The agent action generating unit 123 receives inputs of agent action space environment data indicating the environment of the agent action space in which a character in AR content or a robot acts and the "action model (machine learning model)" generated by the action learning unit 122, estimates an action determined to be performed by the agent, and generates "agent action control data" for causing the agent to act on the basis of the estimated action.

As shown in FIG. 9, the agent action generating unit 123 receives an input of each piece of the following data as input data:

(a) agent action space environment data 181; and
(b) action model (machine learning model) 171.

The (a) agent action space environment data 181 is environment data of the space in which the agent such as a character in an AR image or a robot in the real world that is made to imitate an action of a person or the like by the information processing device 100, and is data including layout information about various objects disposed in the space in which the agent acts.

When the agent is a character in an AR image, for example, the environment data is acquired from AR image content, and is stored beforehand into the storage unit 125.

When the agent is a robot, for example, the environment data is acquired from analysis information about the space in which the robot acts, and is stored beforehand into the storage unit 125.

Note that the environment data may be acquired from an external server that provides AR content, for example.

The (b) action model (machine learning model) 171 is an action model (machine learning model) 171 generated by the action learning unit 122, and is a learning model for estimating an action of a real person or the like existing in the environment when an environment map is provided.

Each processing step to be carried out by the agent action generating unit 123 as shown in the flowchart in FIG. 9 is now described.

(Step S131)

First, in step S131, the agent action generating unit 123 generates an agent action space environment map.

The agent action space environment map is generated with the use of the "(a) agent action space environment data 181", which is input data.

The agent action space environment map is data including position and type information about objects in the space in which the agent (a character or a robot) acts.

(Step S132)

Next, in step S132, the agent action generating unit 123 performs a process of updating the agent action space environment map.

The {(a) agent action space environment data 181}, which is input data, is sequentially updated, and the process of updating the agent action space environment map is performed on the basis of the update data.

(Step S133)

Next, in step S133, the agent action generating unit 123 estimates an action of the agent (a character or a robot).

The agent action generating unit 123 receives inputs of an agent action space environment map indicating the environment of the agent action space in which a character in AR content or a robot acts and the "action model (machine learning model)" generated by the action learning unit 122, estimates an action determined to be performed by the agent, and generates "agent action control data" for causing the agent to act on the basis of the estimated action.

As a result,
"agent action control data 191", which is shown as the output data in FIG. 9,
is generated.

The "agent action control data 191" generated by the agent action generating unit 123 is stored into the storage unit 125. The "agent action control data" generated by the agent action generating unit 123 is also input to the output unit 130 via the storage unit 125 or directly.

The output control unit 131 of the output unit 130 receives an input of the "agent action control data" generated by the agent action generating unit 123, and causes the agent to act in accordance with the "agent action control data" in the agent action space.

[4. Specific Example of Character Control in AR Content by the Information Processing Device of the Present Disclosure]

Next, a specific example of character control in AR content by the information processing device of the present disclosure that performs the processes described above is described.

An example in which an AR character that performs a human-like action similar to that of a human in a living room displayed in AR content is now described.

Figure 10:
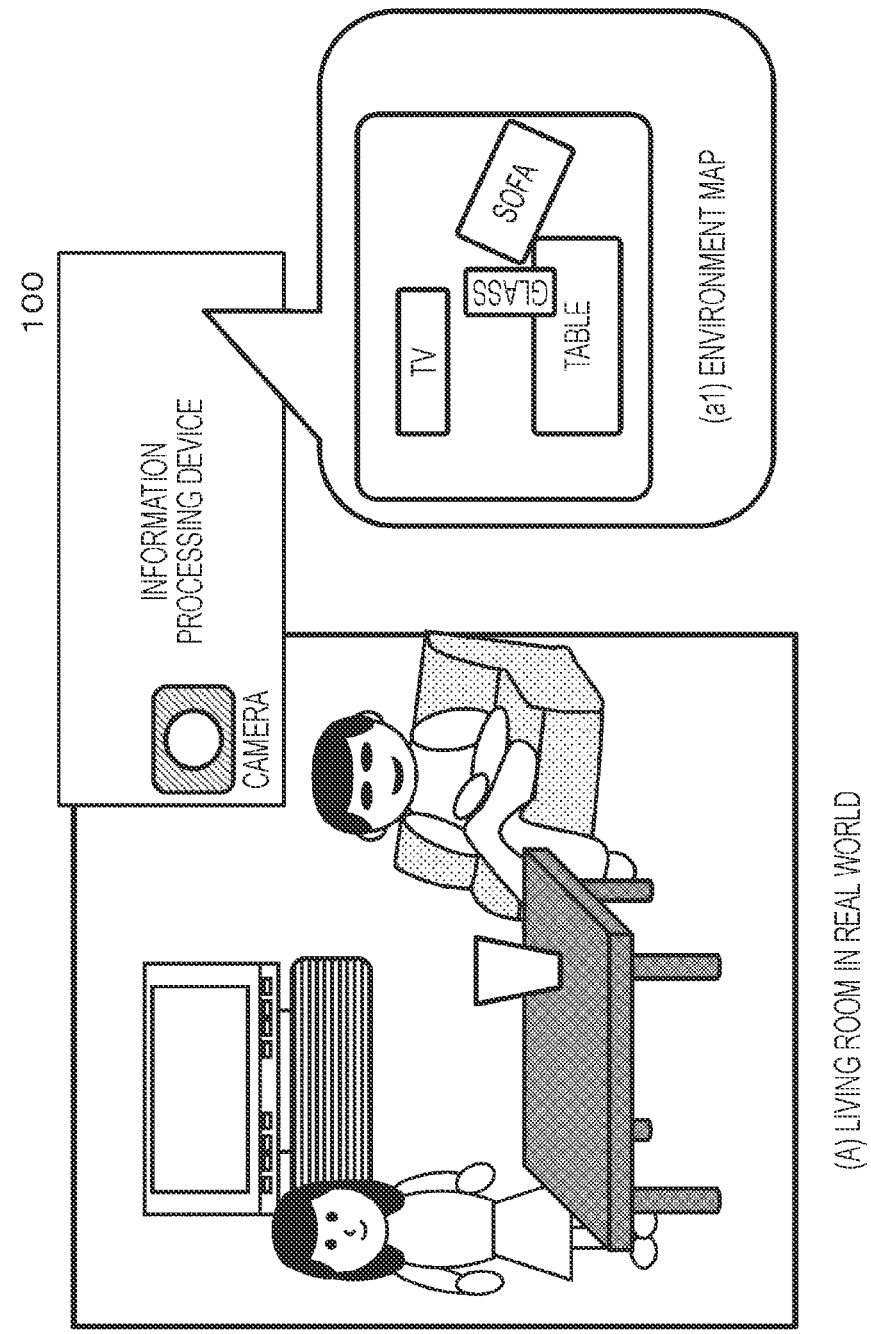
FIG. 10 is a diagram for explaining example processes to be performed by the information processing device of the present disclosure.
Figure 11:
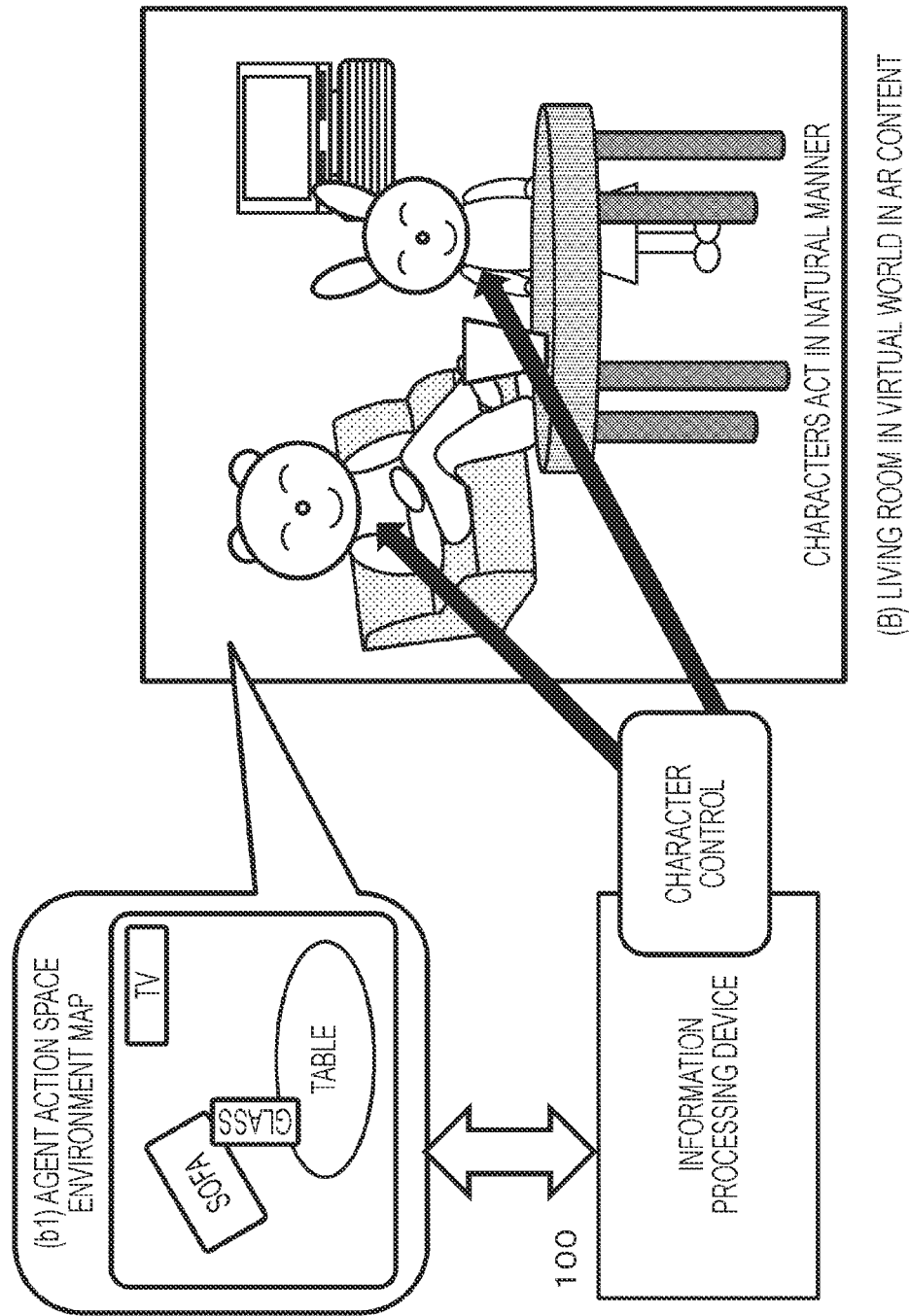
FIG. 11 is a diagram for explaining example processes to be performed by the information processing device of the present disclosure.

Referring to FIGS. 10 and 11, example processes to be performed by the information processing device 100 of the present disclosure are described.

First, as shown in FIG. 10, the information processing device 100 senses a living room in the real world with a sensor such as a camera, for example.

Next, the data recording unit 121 of the data processing unit 120 of the information processing device 100 generates an environment map according to the flow shown in FIG. 4 described above.

This process is the process in step S101 in the flow shown in FIG. 4.

The environment map can be generated by a technique such as semantic segmentation, for example.

The information processing device 100 further acquires action data of a person observed by a camera or some other sensor. For example, a motion capture sensor is used to sense an action of a person.

The data recording unit 121 of the data processing unit 120 of the information processing device 100 analyzes an action of a person, using the environment map and the action data of the person, in accordance with the flow shown in FIG. 4 described above.

This process is the process in step S103 in the flow shown in FIG. 4.

For example, analysis of a person's action, including the relationship between a person's action and an object, such as the positional relationship between a chair and a person and the state of the chair, is conducted.

Note that the target object may be only a single chair, or may be the relationship in a plurality of objects such as a table and another chair.

The data recording unit 121 of the data processing unit 120 of the information processing device 100 records the analyzed person's action, the environment map, and the time that are associated with one another, in accordance with the flow shown in FIG. 4 described above. That is, time/action/environment map correspondence data is generated.

This process is the process in step S104 in the flow shown in FIG. 4.

The person's actions recorded in the time/action/environment map correspondence data can include actions such as interactively interacting with an object and sitting on a chair.

Further, the recorded person's actions can include an action such as yawning that is not interactive with any object.

For example, actions and changes in a relevant person and the environment map can be recorded in chronological order over a long time such as six hours.

Next, the action learning unit 122 of the data processing unit 120 of the information processing device 100 receives an input of the "time/action/environment map correspondence data" generated by the data recording unit 121, and performs a process of learning (machine learning) actions of a person or the like in the actual world, to generate an action model (machine learning model).

When an environment map is provided, the "action model (machine learning model)" is a learning model for estimating an action of a real person or the like existing in the environment.

This process is a process according to the flow shown in FIG. 8 described above.

Note that the action learning unit 122 may perform a learning process, using data recorded by a plurality of persons in a plurality of environments, for example. The action learning unit 122 generates an action model of a person associated with environment maps in chronological order.

The "action model (machine learning model)" generated by the action learning unit 122 can output natural action data of a person who acts in an environment map, using the environment map generated from environment data as input data.

With the use of this "action model (machine learning model)", an AR character that performs a human-like action similar to that of a human in a living room displayed in AR content can be controlled as shown in FIG. 11, for example.

This process is a process to be performed by the agent action generating unit 123 of the data processing unit 120 and the output unit 130 of the information processing device 100.

According to the flowchart shown in FIG. 9 described above, the agent action generating unit 123 generates the agent action control data, using the agent action space environment map and the "action model (machine learning model)".

The output unit 130 controls the characters in the AR content, on the basis of the agent action control data generated by the agent action generating unit 123.

Through these processes, an AR character displayed in the AR content can be made to perform a human-like action similar to that of a human.

Note that an environment map generated from the environment data corresponding to the agent's action space is input to the "action model (machine learning model)", and the agent action generating unit 123 estimates an action of the agent in the environment map.

Action estimation using the "action model (machine learning model)" can also be performed while real-time sensing data of the real world is sequentially acquired. Alternatively, the results of sensing over a certain period of time are stored in the storage unit, and action estimation can be performed with the use of the results.

[5. Various Example Processes for which the Information Processing Device of the Present Disclosure is Used]

Next, various example processes for which the information processing device 100 described above is used are now described.

In FIGS. 1, 10, and 11 described above, the generation target space for an environment map is an indoor living room. However, this is merely an example, and the generation target space for an environment map can be various kinds of spaces.

For example, in the case of an indoor site, it is possible to generate an environment map corresponding to each environment in various indoor environments such as a living room, a conference room, a factory, and an entire house, and it is possible to control actions of an agent, using the generated environment map.

Also, in the case of an outdoor site, it is possible to generate an environment map corresponding to each environment in various outdoor environments such as a sidewalk, a road, and a vehicle interior, for example, and it is possible to control actions of an agent, using the generated environment map.

For example, outdoor environment data is acquired by a sensor such as a monitoring camera.

Specifically, it is possible to generate an action model in which the action characteristics of a person outdoors is recorded, by recording and learning the relationship between actions of a person and objects in an outdoor environment, such as a person stopping when a traffic signal is red, a person walking when a traffic signal is green, a person avoiding a car, and a person being afraid of a car, for example. By controlling the agent in accordance with this action model, it is possible to cause the agent to perform actions similar to actions of a person outdoors.

Further, actions to be imitated by the agent can include both short-term actions and long-term actions. Furthermore, it is possible to record not only actions but also voices such as an utterance, and cause the agent to imitate the actions and the voices.

Specifically, voice is included in the action data of the sensing target person, in the environment data, or in both sets of data. A process including a voice such as a conversation or an utterance in accordance with an action is performed in all of the recording process, the learning process, and the agent action generating process. Voice information may be included in the environment map.

For example, a person's utterance such as a voice emitted when the person is surprised at the sound of a beeping horn of a car, is looking around, is uttering when throwing a ball, or is uttering the person's thoughts while watching television is recorded, so that an action model in which the person's utterance is recorded together with an action is generated. By controlling the agent in accordance with this action model, it is possible to cause the agent to perform an action and an utterance by imitating an action and an utterance of the person.

Further, in the embodiment described above, a configuration in which the agent is made to learn various actions of a person and perform these actions has been described. However, it is also possible to adopt a configuration in which the agent is only made to learn an action for achieving a specific purpose and use the result of the learning, for example.

Specifically, it is also possible to adopt a configuration in which only an action for reaching a predetermined destination, and the agent is made to perform a natural action to reach the destination, for example.

[6. Embodiment in which a Plurality of Action Analysis Targets and a Plurality of Agents are Set]

Next, an embodiment in which a plurality of action analysis targets and a plurality of agents are set is described.

The target whose actions are to be recorded by the data recording unit 121 of the data processing unit 120 of the information processing device 100 of the present disclosure is not necessarily actions of one person.

It is possible to record actions of a plurality of persons as processing targets.

When there is a plurality of sensing target persons as action analysis targets, it is also possible to generate actions including an interaction between a plurality of agents.

When an action recording target is represented by A, an action of a person other than A is separately recorded. When a learning process is performed, the action of A is associated with the action of the person other than A, so that the action of A is learned to generate an action model.

As described above, by causing a plurality of agents to perform actions using the action model in which action information including the relation between a plurality of persons is recorded, for example, it is possible to reproduce the following actions between a plurality of agents as actions similar to those of humans:

a conversation between agents;

parcel delivery between agents; and giving way between agents.

For example, it is possible to control an interactive action between the plurality of agents as an action similar to an action of a human.

Note that the plurality of agents that act at the same time may or may not include an artificial agent that acts autonomously, a character operated by a user, and the user in the real world.

Specific process sequences to be performed by the data processing unit 120 of the information processing device 100 when processes are performed with respect to a plurality of action analysis targets and a plurality of agents are now described with reference to FIGS. 12 to 14.

Figure 12:
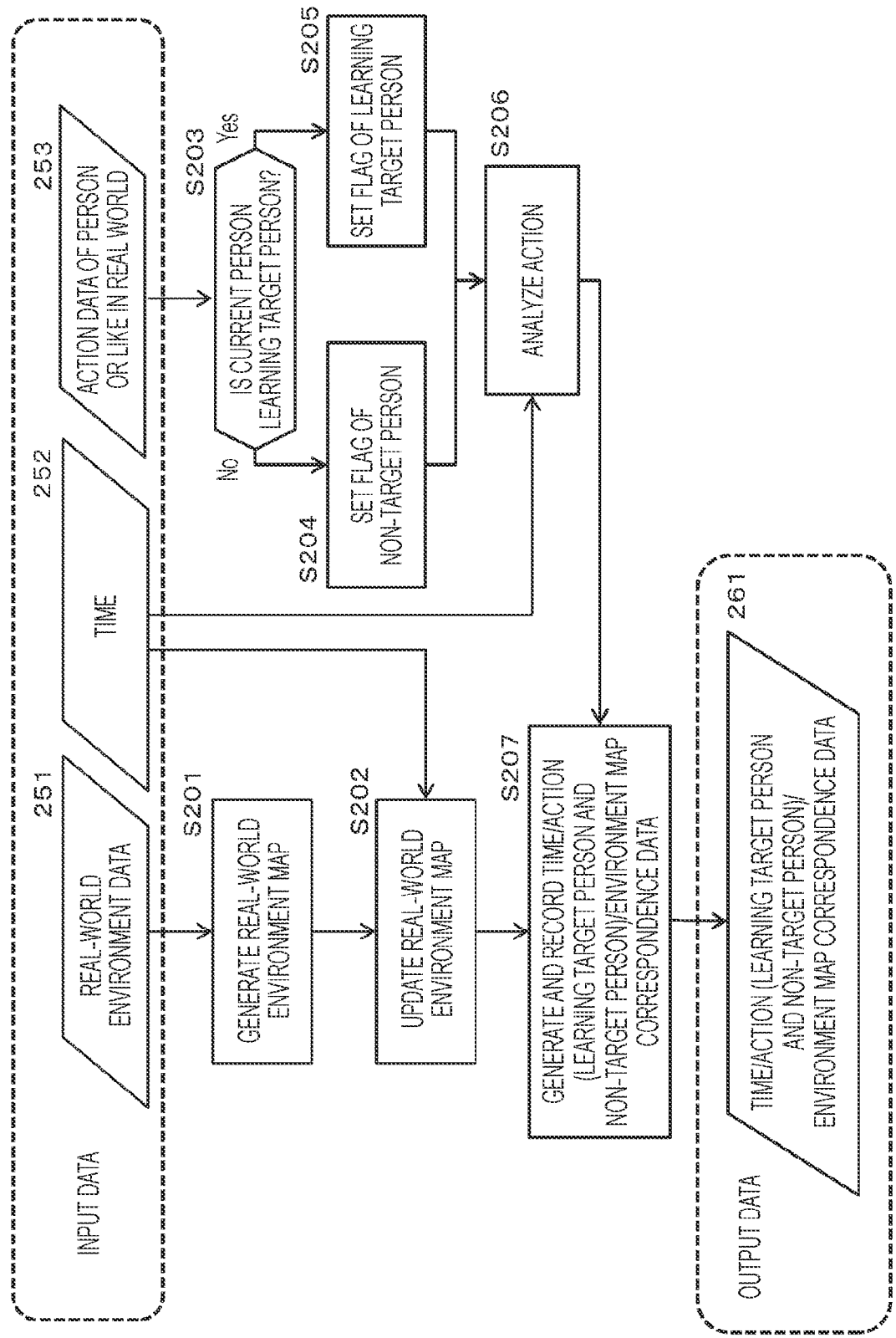
FIG. 12 is a diagram specifically showing processes to be performed by the data recording unit of the data processing unit of the information processing device.
Figure 13:
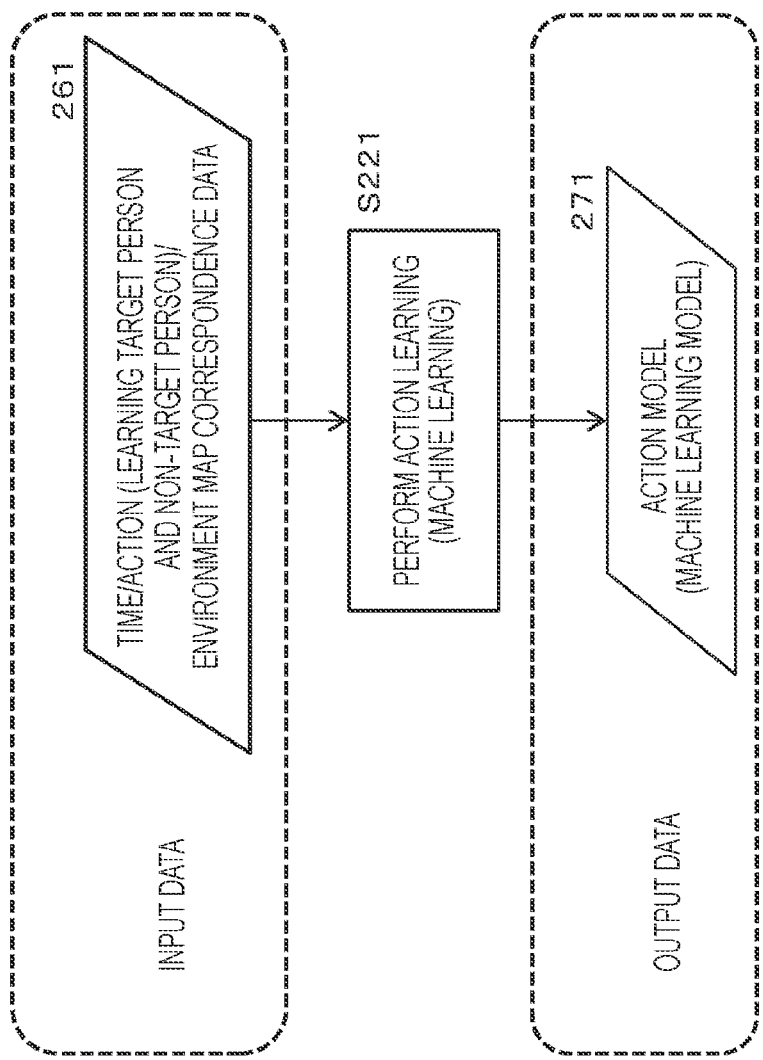
FIG. 13 is a diagram for specifically explaining a process to be performed by the action learning unit of the data processing unit of the information processing device.
Figure 14:
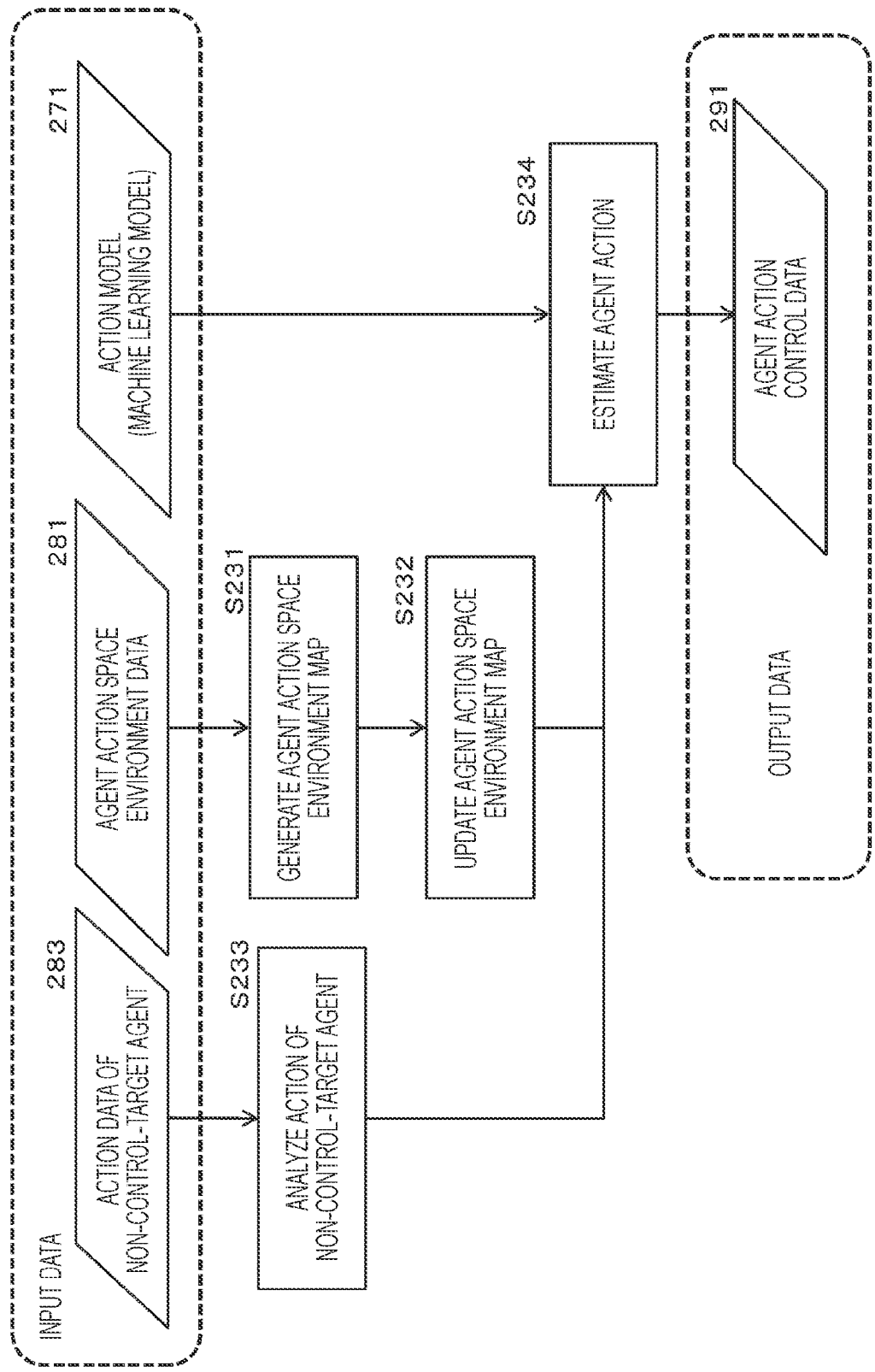
FIG. 14 is a diagram for specifically explaining processes to be performed by the agent action generating unit of the data processing unit of the information processing device.

FIGS. 12, 13, and 14 are flowcharts for explaining processes to be performed by the data recording unit 121, the action learning unit 122, and the agent action generating unit 123 of the data processing unit 120, respectively.

(6-1. Details of Processes to be Performed by the Data Recording Unit)

Referring first to FIG. 12, processes to be performed by the data recording unit 121 of the data processing unit 120 are described.

The data recording unit 121 receives an input of each piece of the following data:

(a) real-world environment data 251;

(b) time 252; and (c) action data 253 of a person or the like in the real world, and generates time/action/environment map correspondence data 261 as output data.

Each processing step to be carried out by the data recording unit 121 as shown in the flowchart in FIG. 12 is now described.

(Steps S201 and S202)

The processes in steps S201 and S202 are similar to the processes steps S101 and S102 described above with reference to FIG. 4.

That is, the data recording unit 121 first generates a real-world environment map in step S201.

The real-world environment map is generated with the use of the "(a) real-world environment data 151", which is input data.

Further, in step S202, a process of updating the real-world environment map is performed.

(Steps S203 to S206)

Steps S203 to S206 are steps of performing an action analysis process.

First, in step S203, the data recording unit 121 determines whether or not each person detected from input data acquired by the camera or the sensor is a learning target person.

Note that the learning target person is determined in advance, and feature data such as a face image is registered, for example. In step S203, each person detected from input data is compared with the registered information, and is determined whether or not to be the learning target person.

If the person is not the learning target, a flag indicating that the person is not the learning target is set in step S204.

If the person is the learning target, a flag indicating that the person is the learning target is set in step S205.

Further, in step S206, an action analysis process is performed.

The (b) time 152, and the (c) action data 153 of a person or the like in the real world are input, and an action of the person as the learning target is analyzed. Note that, in this action analysis process, an action related to an interaction between the person as the learning target and other persons is also to be analyzed.

(Step S207)

Lastly, in step S207, the data recording unit 121 generates time/action (learning target person and non-target person)/environment map correspondence data, and records the data into the storage unit 125.

The data recording unit 121 generates time/action (learning target person and non-target person)/environment map correspondence data, using the time-series data of the environment map generated in step S202, and the action analysis result generated in step S206.

The "time/action (learning target person and non-target person)/environment map correspondence data" is data in which time, an action of a person or the like in the real world, and an environment map are recorded and associated with one another. An environment map is data containing object types and layout information.

Note that, in this example process, actions include an action of the learning target person and an action of a non-learning-target person.

As a result of these processes,

"time/action (learning target person and non-target person)/environment map correspondence data 261", which is shown as the output data in FIG. 12, is generated.

The "time/action (learning target person and non-target person)/environment map correspondence data 261" generated by the data recording unit 121 is stored into the storage unit 125. The "time/action (learning target person and non-target person)/environment map correspondence data 261" is input to the action learning unit 122 via the storage unit 125 or directly.

(6-2. Details of a Process to be Performed by the Action Learning Unit)

Next, a process to be performed by the action learning unit 122 of the data processing unit 120 of the information processing device 100 is described in detail, with reference to FIG. 13.

The action learning unit 122 receives an input of the "time/action (learning target person and non-target person)/environment map correspondence data" generated by the data recording unit 121, and performs a process of learning (machine learning) actions of a person or the like in the actual world, to generate an action model (machine learning model).

When an environment map is provided, the "action model (machine learning model)" is a learning model for estimating an action of a real person or the like existing in the environment.

As shown in FIG. 13, the action learning unit 122 receives an input of the following data as input data:

(a) time/action (learning target person and non-target person)/environment map correspondence data 261.

The "time/action (learning target person and non-target person)/environment map correspondence data 261" is data generated by the data recording unit 121, and is data in which time, an action of a person or the like in the real world, and an environment map are associated with one another and are recorded. Actions include an action of the learning target person and an action of a non-learning-target person.

The action learning unit 122 receives an input of the "time/action (learning target person and non-target person)/environment map correspondence data 261", and performs the process in step S221 described below.

(Step S221)

The action learning unit 122 receives an input of the "time/action (learning target person and non-target person)/environment map correspondence data 261", and performs a process of learning (machine learning) actions of a person or the like in the actual world, to generate an action model (machine learning model) in step S221.

When an environment map is provided, the "action model (machine learning model)" is a learning model for estimating an action of a real person or the like existing in the environment.

As a result of the process in step S221, the "action model (machine learning model) 271", which is shown as the output data in FIG. 13, is generated.

This "action model (machine learning model)" generated by the action learning unit 122 is stored into the storage unit 125. The "action model (machine learning model)" generated by the action learning unit 122 is also input to the agent action generating unit 123 via the storage unit 125 or directly.

(6-3. Details of Processes to be Performed by the Agent Action Generating Unit)

Next, processes to be performed by the agent action generating unit 123 are described in detail, with reference to FIG. 14.

The agent action generating unit 123 receives inputs of agent action space environment data indicating the environment of the agent action space in which a character in AR content or a robot acts and the "action model (machine learning model)" generated by the action learning unit 122, estimates an action determined to be performed by the agent, and generates "agent action control data" for causing the agent to act on the basis of the estimated action.

As shown in FIG. 14, the agent action generating unit 123 receives an input of each piece of the following data as input data:

(a) agent action space environment data 281;

(b) action model (machine learning model) 271; and (c) action data 283 of a non-control-target agent.

The (a) agent action space environment data 181 is environment data of the space in which an agent such as a character in an AR image or a robot in the real world that is made to imitate an action of a person or the like by the information processing device 100, and is data including layout information about various objects disposed in the space in which the agent acts.

When the agent is a character in an AR image, for example, the environment data is acquired from AR image content, and is stored beforehand into the storage unit 125.

When the agent is a robot, for example, the environment data is acquired from analysis information about the space in which the robot acts, and is stored beforehand into the storage unit 125.

Note that the environment data may be acquired from an external server that provides AR content, for example.

The (b) action model (machine learning model) 171 is an action model (machine learning model) 171 generated by the action learning unit 122, and is a learning model for estimating an action of a real person or the like existing in the environment when an environment map is provided.

The (c) action data 283 of a non-control-target agent is action data of an agent who is not an agent to be controlled by the information processing device 100.

When the agent is a character in an AR image, for example, this data is acquired from AR image content, and is stored beforehand into the storage unit 125.

Note that the environment data may be acquired from an external server that provides AR content, for example.

Each processing step to be carried out by the agent action generating unit 123 as shown in the flowchart in FIG. 14 is now described.

(Step S231)

First, in step S231, the agent action generating unit 123 generates an agent action space environment map.

The agent action space environment map is generated with the use of the "(a) agent action space environment data 181", which is input data.

The agent action space environment map is data including position and type information about objects in the space in which the agent (a character or a robot) acts.

(Step S232)

Next, in step S232, the agent action generating unit 123 performs a process of updating the agent action space environment map.

The {(a) agent action space environment data 181}, which is input data, is sequentially updated, and the process of updating the agent action space environment map is performed on the basis of the update data.

(Step S233)

Next, in step S233, the agent action generating unit 123 receives an input of (c) action data 283 of a non-control-target agent, and analyzes an action of the non-control-target agent.

(Step S234)

Next, in step S234, the agent action generating unit 123 estimates an action of the agent (a character or a robot) to be controlled.

The agent action generating unit 123 receives inputs of an agent action space environment map indicating the environment of the agent action space in which a character in AR content or a robot acts, the "action model (machine learning model)" generated by the action learning unit 122, and further, the non-control-target agent action analysis result generated in step S233. The agent action generating unit 123 then estimates an action determined to be performed by the agent, and generates "agent action control data" for causing the control target agent to act on the basis of the estimated action.

As a result,

"agent action control data 291", which is shown as the output data in FIG. 14, is generated.

The agent action control data 291 is data for controlling actions including an interaction between the control target agent and some other agent.

The "agent action control data 291" generated by the agent action generating unit 123 is stored into the storage unit 125. The "agent action control data" generated by the agent action generating unit 123 is also input to the output unit 130 via the storage unit 125 or directly.

The output control unit 131 of the output unit 130 receives an input of the "agent action control data" generated by the agent action generating unit 123, and causes the agent to act in accordance with the "agent action control data" in the agent action space.

[7. Embodiment that Takes into Account Processes to be Performed when an Unanticipated Action Difficult to be Subjected to Analyze Analysis is Observed]

Next, an embodiment that takes into account processes to be performed when an unanticipated action difficult to be subjected to action analysis is observed is described.

In the embodiments and modifications described so far, action data of an observation target person in the real world is subjected to action analysis by the data recording unit 121 of the data processing unit 120.

However, action data might include an unanticipated action that cannot be interpreted in the action analysis process to be performed by the data recording unit 121.

In the embodiment described below, when such an action is observed, the action is recorded separately as an "unanticipated action", and the action analysis process can be performed later.

Note that, when the action analysis process is not additionally performed, the unanticipated action is not learned.

For example, in the analysis algorithms for the action analysis process to be performed by the data recording unit 121, actions such as holding and drinking are set as possible interactive actions regarding a plastic bottle beverage.

However, an analysis algorithm for a lid opening action might not be included.

In such a case, when a person performs a lid opening action, the data recording unit 121 cannot correctly analyze the action. In such a case, the data recording unit 121 separately records the lid opening action as an unanticipated action, and performs an action analysis process including the lid opening action, after correcting or adding the analysis algorithm.

By performing such a two-phase action analysis process, it is possible to incorporate an unanalyzable action as an analysis result, without collecting data again.

Processes to be performed by the data recording unit 121 of the data processing unit 120 of the information processing device 100 in this embodiment are now described with reference to FIGS. 15 and 16.

Figure 15:
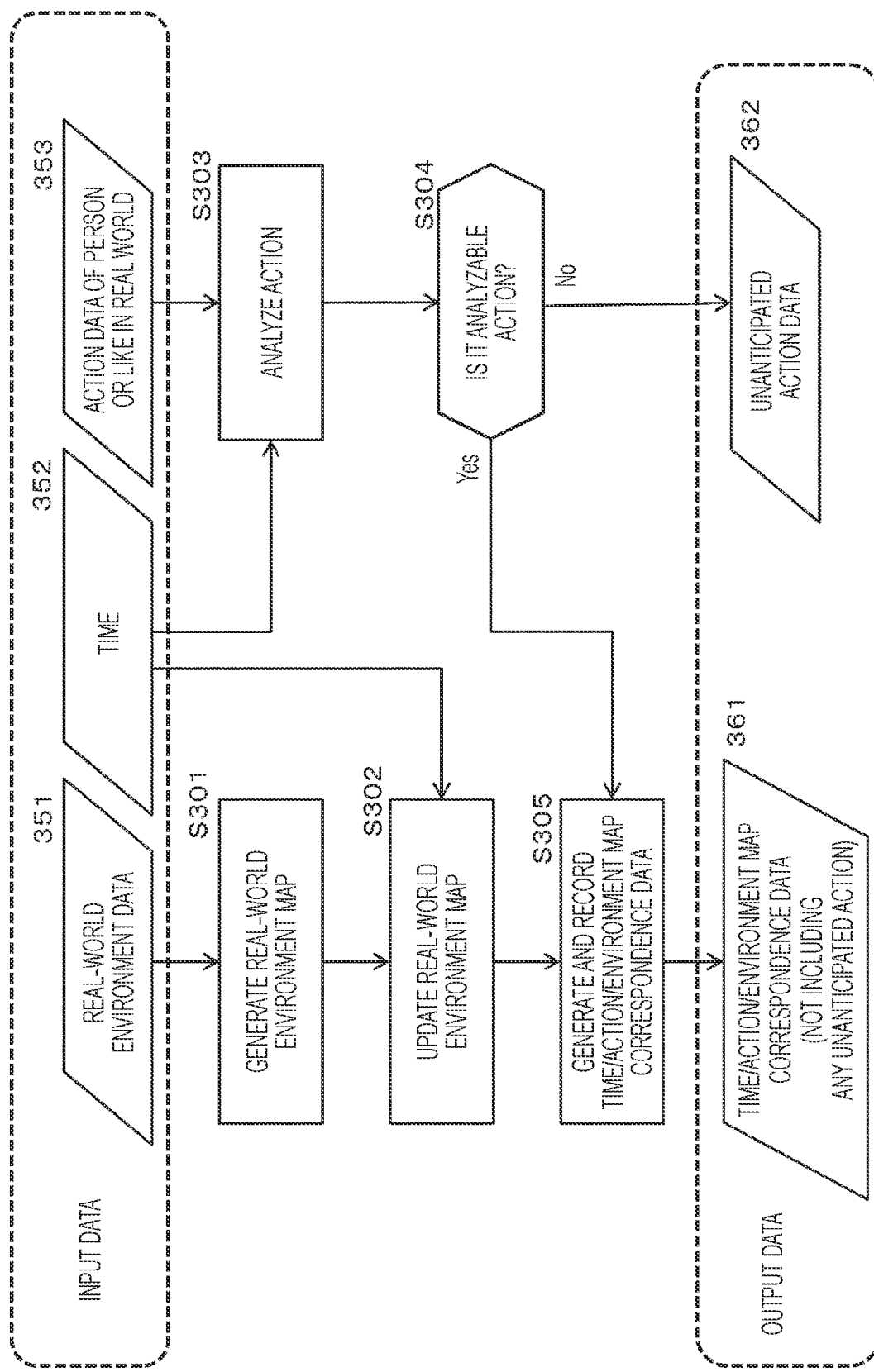
FIG. 15 is a diagram specifically showing processes to be performed by the data recording unit of the data processing unit of the information processing device.

The flow shown in FIG. 15 is a flow for explaining a process of separately recording an unanticipated action that cannot be interpreted in the action analysis process as an "unanticipated action".

Figure 16:
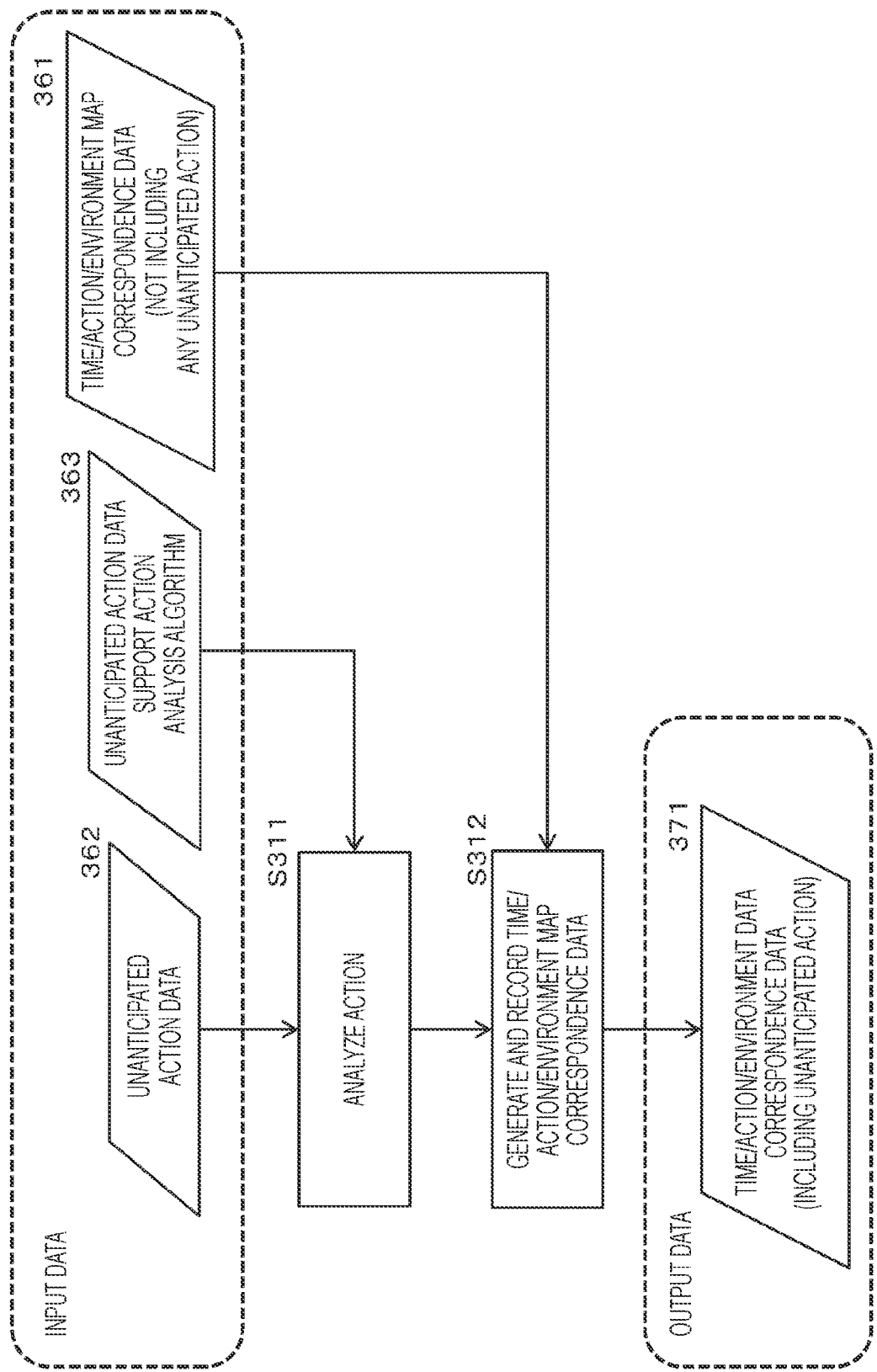
FIG. 16 is a diagram specifically showing processes to be performed by the data recording unit of the data processing unit of the information processing device.

The flow shown in FIG. 16 is a flow for explaining a process of performing the action analysis process by correcting or adding an analysis algorithm after performing the process shown in the flow in FIG. 15.

Referring first to FIG. 15, the flow for explaining the process of separately recording an unanticipated action that cannot be interpreted in the action analysis process as an "unanticipated action" is described.

As shown in FIG. 15, the data recording unit 121 receives an input of each piece of the following data:

(a) real-world environment data 351;

(b) time 352; and (c) action data 353 of a person or the like in the real world.

(Steps S301 and S302)

The processes in steps S301 and S302 are similar to the processes steps S101 and S102 described above with reference to FIG. 4.

That is, the data recording unit 121 first generates a real-world environment map in step S301.

The real-world environment map is generated with the use of the "(a) real-world environment data 151", which is input data.

Further, in step S302, a process of updating the real-world environment map is performed.

(Steps S303 and S304)

Steps S303 and S304 are steps of performing an action analysis process.

First, in step S303, the data recording unit 121 receives inputs of the following pieces of data:

(b) time 152, and
(c) action data 153 of a person or the like in the real world, and analyzes an action of a person or the like in the real world.

An action of a person or the like in the real world is analyzed on the basis of data acquired by the camera 111 or the sensor 113, for example. As described above, the sensor 113 includes a motion capture sensor, and the data recording unit 121 analyzes an action of a person (a living creature) in the real world, using these pieces of information.

However, an action not included in the action analysis algorithm to be executed by the data recording unit 121 cannot be analyzed.

In step S304, an analyzable action or an unanalyzable action is determined, and an analysis result is generated with respect to an analyzable action. The process then moves on to step S305.

On the other hand, an unanalyzable action is output as unanticipated action data 362 shown as the output data in FIG. 15.

(Step S305)

Lastly, in step S305, the data recording unit 121 generates time/action (learning target person and non-target person)/ environment map correspondence data, and records the data into the storage unit 125.

The data recording unit 121 generates time/action/environment map correspondence data 361, using the time-series data of the environment map generated in step S302, and the action analysis result generated in steps S303 and S304.

The "time/action/environment map correspondence data 361" is data in which time, an action of a person or the like in the real world, and an environment map are recorded and associated with one another. An environment map is data containing object types and layout information.

In this example process, however, the "time/action/environment map correspondence data 361" does not include any unanticipated action determined to be unanalyzable.

Next, the process sequence in which the data that is output as the unanticipated action data 362 in the flow in FIG. 15 is received as an input, and the "time/action/environment map correspondence data" including the unanticipated action data is generated is described with reference to FIG. 16.

The flow shown in FIG. 16 is a flow for explaining a process in which the data recording unit 121 performs the action analysis process by correcting or adding an analysis algorithm after performing the process shown in the flow in FIG. 15.

The flow shown in FIG. 16 is now described.

The data recording unit 121 receives an input of each piece of the following data as input data:

(a) time/action/environment map correspondence data 361;
(b) unanticipated action data 362; and
(c) unanticipated action data support action analysis algorithm 363.

The (a) time/action/environment map correspondence data 361 is the data generated in accordance with the flow shown in FIG. 15. However, this data does not include any unanticipated action.

The (b) unanticipated action data 362 is the data that is output as a result of the processes in steps S303 and S304 in the flow shown in FIG. 15. That is, the unanticipated action data 362 is action data determined to be of an unanalyzable action.

The (c) unanticipated action data support action analysis algorithm 363 is an algorithm in which unanticipated action data is corrected to be analyzable or is newly added. This algorithm is acquired from an external server or the like, for example.

The processes in the respective steps in the flow shown in FIG. 16 are now described.

(Step S311)

Step S311 is a step of performing an action analysis process. The analysis target herein is the (b) unanticipated action data 362.

The data recording unit 121 performs the action analysis process for the "(b) unanticipated action data 362", using the "(c) unanticipated action data support action analysis algorithm 363".

(Step S312)

Next, in step S312, the data recording unit 121 generates time/action/environment map correspondence data, and records the data into the storage unit 125.

The data recording unit 121 performs a process of incorporating the action analysis result regarding the unanticipated action data generated in step S311 into the time/action/environment map correspondence data generated in the flow shown in FIG. 15 described above, and generates time/action/environment map correspondence data 371 including the unanticipated action data.

By performing this two-phase action analysis process, it is possible to incorporate an unanalyzable action as an analysis result, without collecting data again.

[8. Example Control on an Agent Acting in the Real World]

Next, example control on an agent that acts in the real world is described.

As described above with reference to FIG. 3, the information processing device 100 of the present disclosure can also control a robot that acts in the real space.

That is, instead of a character that is displayed as an agent in AR content, a robot that acts in the real world is made to act like a person.

In this embodiment, a process sequence to be performed by the agent action generating unit 123 of the data processing unit 120 of the information processing device 100 is described with reference to a flow shown in FIG. 17.

Figure 17:
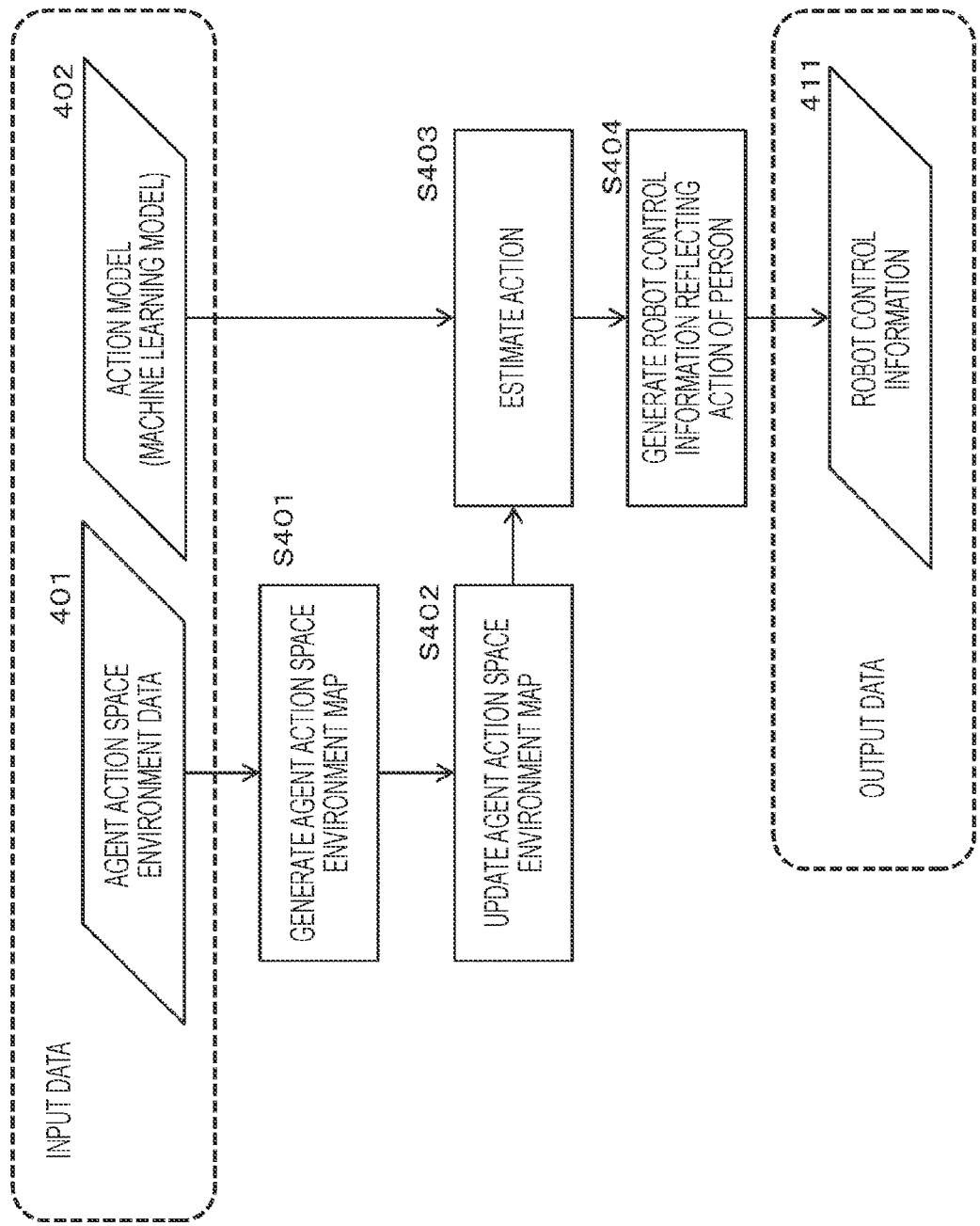
FIG. 17 is a diagram for specifically explaining processes to be performed by the agent action generating unit of the data processing unit of the information processing device.

As shown in FIG. 17, the agent action generating unit 123 receives an input of each piece of the following data as input data:

(a) agent action space environment data 401; and
(b) action model (machine learning model) 402.

The (a) agent action space environment data 401 is environment data of the real space in which the agent, which is a robot, acts, and is data including layout information regarding various objects disposed in the real space in which the robot acts.

This environment data is acquired from analysis information of a space in which the robot acts, and is stored beforehand into the storage unit 125.

The (b) action model (machine learning model) 402 is an action model (machine learning model) 402 generated by the action learning unit 122, and is a learning model for estimating an action of a real person or the like existing in the environment when an environment map is provided.

Each processing step to be carried out by the agent action generating unit 123 as shown in the flowchart in FIG. 17 is now described.

(Step S401)

First, in step S401, the agent action generating unit 123 generates an agent action space environment map.

The agent action space environment map is generated with the use of the "(a) agent action space environment data 401", which is input data.

The agent action space environment map is data including position and type information about objects in the space in which the agent (robot) acts.

(Step S402)

Next, in step S402, the agent action generating unit 123 performs a process of updating the agent action space environment map.

The {(a) agent action space environment data 401}, which is input data, is sequentially updated, and the process of updating the agent action space environment map is performed on the basis of the update data.

(Steps S403 and S404)

Next, in step S403, the agent action generating unit 123 estimates an action of the agent (robot).

The agent action generating unit 123 receives inputs of an agent action space environment map indicating the environment of the agent action space in which the robot acts and the "action model (machine learning model)" generated by the action learning unit 122, estimates an action determined to be performed by the agent, and, in step S404, generates "robot control information 411" for causing the agent (robot) to act on the basis of the estimated action.

As a result,
the "robot control information 411", which is shown as the output data in FIG. 17,
is generated.

The "robot control information 411" generated by the agent action generating unit 123 is input to the output unit 130 via the storage unit 125 or directly.

The output control unit 131 of the output unit 130 receives an input of the "robot control information 411" generated by the agent action generating unit 123, and causes the robot to act in accordance with the "robot control information 411" in the agent action space, which is the real space in which the robot acts.

Figure 18:
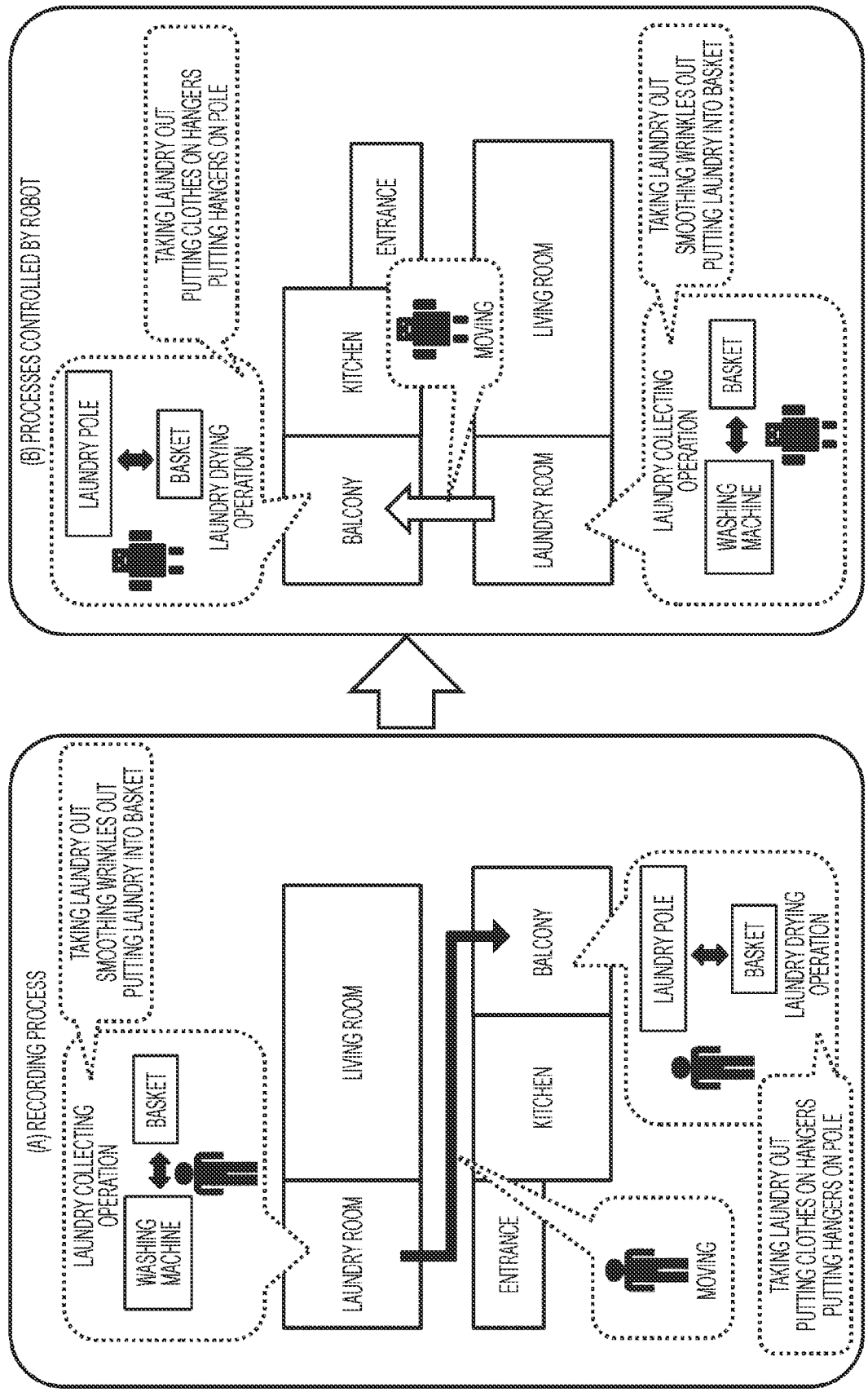
FIG. 18 is a diagram for explaining example processes to be performed by the information processing device of the present disclosure.

By this process, processes as shown in FIG. 18 becomes possible, for example.

A recording process shown in FIG. 18(A) is a process of recording processes being performed by a person. Processes being performed by a person are recorded and learned in this manner, so that an action model is generated.

Further, robot control information is generated on the basis of the generated action model, so that the robot is controlled. As a result, it is possible to perform processes by robot control shown in FIG. 18(B).

Note that, when the recording process shown in FIG. 18(A) is performed, the inside of the house is sensed by a plurality of monitoring cameras, for example, and an environment map is generated by a technique such as semantic segmentation, for example.

Further, actions of a person are sensed by similar monitoring cameras, for example, so that action analysis data is generated.

For example, actions of a person are analyzed, including the relations between the actions of the person and objects, such as taking laundry out of the washing machine, putting the laundry into a laundry basket, repeating these actions until the inside of the washing machine becomes empty, taking the laundry to the drying area, and hanging up the laundry to dry.

Further, time/action/environment map correspondence data in which the analyzed actions of the person, the environment map, and the times are associated is generated and recorded.

Further, an action model is generated by a learning process performed with respect to the time/action/environment map correspondence data. As the environment map is input thereto, the generated model outputs household actions that are not limited to simple tasks, such as a series of tasks such as drying laundry, for example.

Robot control information is generated with the use of this action model, and the robot is controlled, so that the robot can be made to perform the same actions as those of a person as shown in FIG. 18(B).

Note that it is also possible to cause a plurality of robots to perform cooperative work by recording and learning cooperative work, such as a plurality of persons spreading out and drying a bed sheet, for example.

Further, the cooperative worker may be set as a human, so that the robot can be controlled to cooperate with the person in performing a task such as spreading out and drying a bed sheet, for example.

[9. Examples of a Process of Learning Actions that are not of a Human, and Processes of Generating and Applying an Action Model]

In the embodiments described above, the learning targets are actions of a person. However, it is also possible to perform a process of learning actions that are not of a human, and processes of generating and applying an action model.

For example, actions of an animal such as a dog or a cat can be learned, and a character in an AR image can be made to imitate the actions.

Alternatively, actions of an automobile or the like can be learned, and a character in an AR image can be made to imitate the actions.

For example, when an action of a dog in the real world are recorded and analyzed, the processes described below are performed.

The data recording unit 121 analyzes the dog's action, including the relations between the dog's action and an object, such as the positional relationship between a ball and the dog, and the condition of the ball, for example. The object to be analyzed may be only a single ball, or may be the relations between a plurality of objects such as a doghouse and another ball.

The data recording unit 121 records the analyzed dog action, an environment map, and time that are associated with one another. The dog's actions to be recorded may include actions that are interactively engaged with an object, such as holding a ball in its mouth.

The dog's actions to be recorded may include actions that are not interactively engaged with any object, such as barking.

For example, actions and changes in the relevant dog and the environment map can be recorded in chronological order over a long time such as six hours.

The action learning unit 122 generates the dog's action model (machine learning model) associated with the environment map in chronological order, by performing learning with recorded data of a plurality of environments and a plurality of dogs.

As an environment map is generated from environment data and is input, the generated model (machine learning model) becomes a model capable of outputting natural actions of a dog over a long period of time. The environment data may or may not be included in the learning data.

The agent action generating unit 123 generates control information regarding actions of the agent, such as a virtual dog character in AR content, for example, using the action model (machine learning model). Action estimation using the "action model (machine learning model)" can also be performed while real-time sensing data of the real world is sequentially acquired. Alternatively, the results of sensing over a certain period of time are stored in the storage unit, and action estimation can be performed with the use of the results.

Note that, in this embodiment, it is possible to record interactive actions of a plurality of living creatures such as a plurality of dogs, persons, and cats, and generate a learned action model. By controlling actions of the agent with such an action model, it is possible to reproduce natural interactive processes between a plurality of agents.

Alternatively, only the positional information may be observed and recorded in the process of observing and recording action data. For example, as for a living creature such as a bee that does not require detailed motion sensing, only changes in positional information may be recorded and generated as an action model. Using this action model, it is possible to cause a virtual character of AR content to perform actions similar to those of a bee. For example, if a model including interactions with an environment map of flowers, trees, and the like in an outdoor environment is generated, a virtual character can be made to perform realistic actions more similar to those of a bee.

[10. Example Hardware Configuration of an Information Processing Device]

Figure 19:
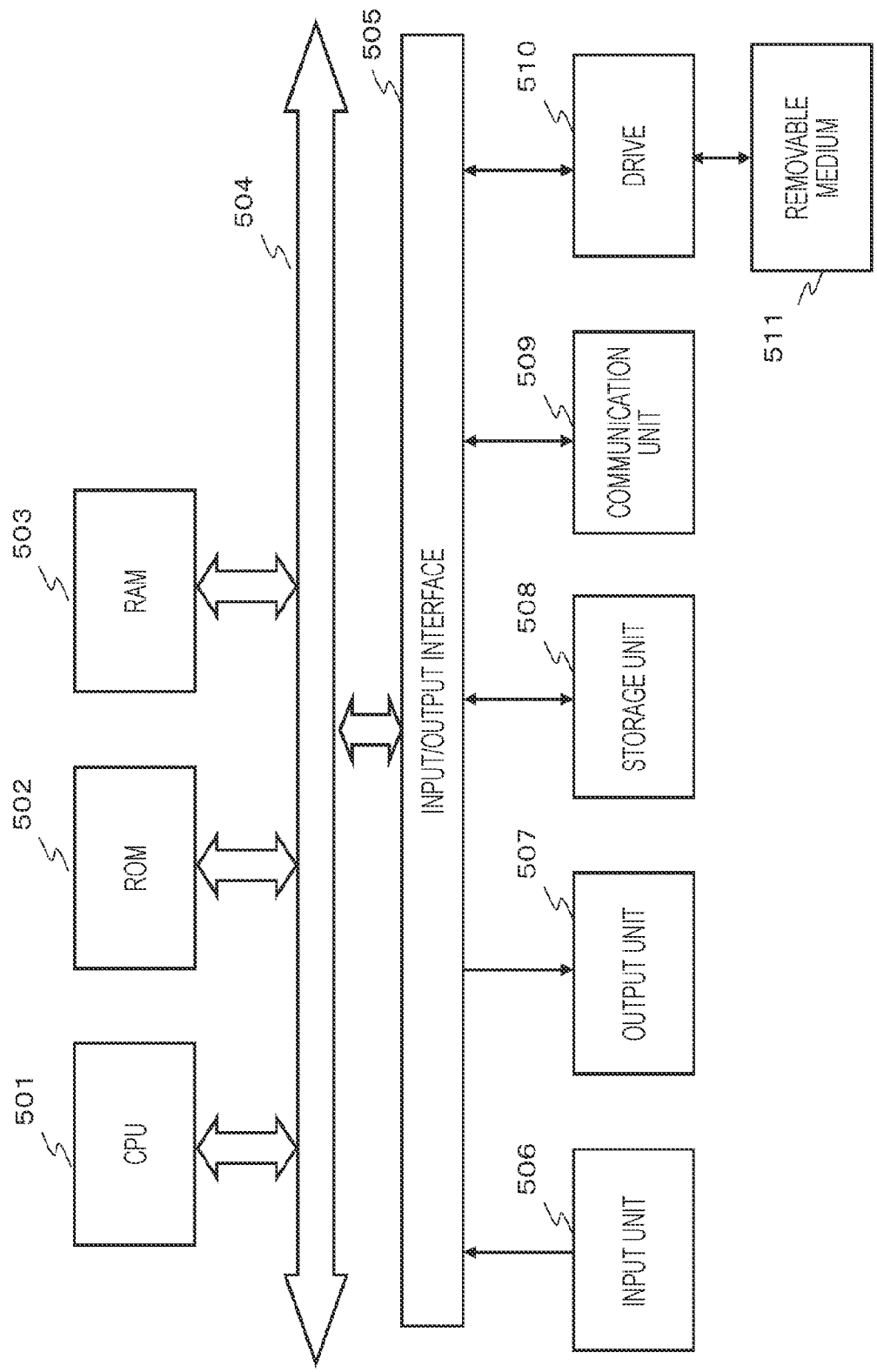
FIG. 19 is a diagram for explaining an example hardware configuration of an information processing device.

Next, referring to FIG. 19, an example hardware configuration of an information processing device is described.

The hardware to be described herein with reference to FIG. 19 is an example hardware configuration of the information processing device described above with reference to FIG. 2.

A central processing unit (CPU) 501 functions as a control unit or a data processing unit that perform various kinds of processes in accordance with a program stored in a read only memory (ROM) 502 or a storage unit 508. For example, the processes in the sequence described in the above embodiments are performed. The program to be executed by the CPU 501, data, and the like are stored in a random access memory (RAM) 503. The CPU 501, the ROM 502, and the RAM 503 are connected to one another by a bus 504.

The CPU 501 is connected to an input/output interface 505 via the bus 504. An input unit 506 formed with various kinds of switches, a keyboard, a mouse, a microphone, a camera, a sensor, and the like, and an output unit 507 formed with a display, a speaker, and the like are also connected to the input/output interface 505. The CPU 501 performs various kinds of processes in accordance with instructions that are input through the input unit 506, and outputs processing results to the output unit 507, for example.

The storage unit 508 connected to the input/output interface 505 is formed with a hard disk or the like, for example, and stores the program to be executed by the CPU 501 and various kinds of data. A communication unit 509 functions as a transmission/reception unit for Wi-Fi communication, Bluetooth (registered trademark) (BT) communication, and other data communication via a network such as the Internet or a local area network, and communicates with external devices.

A drive 510 connected to the input/output interface 505 drives a removable medium 511 such as a magnetic disk, an optical disk, a magnetooptical disk, or a semiconductor memory like a memory card, and performs recording or reading of data.

[11. Summary of the Configuration According to the Present Disclosure]

Embodiments of the present disclosure have been described so far by way of specific examples. However, it is obvious that those skilled in the art can make modifications to and substitutions of the embodiments without departing from the scope of the present disclosure. That is, the present disclosure is disclosed in the form of examples, and the above description should not be interpreted in a restrictive manner. The claims should be taken into account in understanding the subject matter of the present disclosure.

Note that the technology disclosed in this specification may also be embodied in the configurations described below.

(1) An information processing device including:

a data recording unit that generates an environment map including type and layout information about an object in a real world, generates action analysis data of an action object that acts in the real world, and generates time/action/environment map correspondence data including the environment map and time-series data of the action analysis data;

an action learning unit that performs a machine learning process using the time/action/environment map correspondence data, and generates an action model having the environment map as an input value and a result of action estimation as an output value; and an agent action generating unit that generates action control data for an agent, using the action model, the agent being a character in a virtual world or a robot.

(2) The information processing device according to (1), in which the action object that acts in the real world is a human, and the agent action generating unit generates control data for causing the agent to perform an action by imitating an action of the human.

(3) The information processing device according to (1) or (2), in which the agent action generating unit receives an input of agent action space environment data that is environment data of an action space of the agent that is a character in a virtual world or a robot, generates an agent action space environment map including type and layout information about an object in an agent action space, and generates action control data for the agent in the agent action space.

(4) The information processing device according to any one of (1) to (3), in which the action learning unit generates the action model by learning actions including an interaction between the action object that acts in the real world and a real object.

(5) The information processing device according to (4), in which
the agent action generating unit
estimates actions including an interaction between the agent and an object in an agent action space from the action model, and generates the action control data for the agent.

(6) The information processing device according to any one of (1) to (5), in which
the data recording unit
determines whether or not the action object that acts in the real world is an object that is a learning process target, and
generates time/action/environment map correspondence data including action analysis data of each of an action object that is a learning processing target and an action object that is not a learning processing target.

(7) The information processing device according to (6), in which
the action learning unit
performs a machine learning process using the time/action/environment map correspondence data including the action analysis data of each of an action object that is a learning processing target and an action object that is not a learning processing target, and generates an action model having the environment map as an input value and a result of action estimation as an output value, and
the agent action generating unit
generates action control data including an interaction between agents, using the action model.

(8) The information processing device according to any one of (1) to (7), in which
the data recording unit
outputs an unanalyzable action among actions of the action object as unanticipated action data, and generates time/action/environment map correspondence data formed only with action analysis data that does not include the unanticipated action data.

(9) The information processing device according to (8), in which
the data recording unit
generates a result of action analysis of the unanticipated action data, using an algorithm capable of performing action analysis on the unanticipated action data,
performs an update process on the time/action/environment map correspondence data formed only with the action analysis data not including the unanticipated action data, using the generated result of the action analysis of the unanticipated action data, and
generates time/action/environment map correspondence data including the result of the action analysis of the unanticipated action data.

(10) The information processing device according to any one of (1) to (9), in which
the agent action generating unit
generates control information for controlling an action of a character that is a virtual object displayed in an augmented reality (AR) image.

(11) The information processing device according to any one of (1) to (10), in which
the agent action generating unit
generates control information for controlling an action of a robot that acts in the real world.

(12) The information processing device according to any one of (1) to (11), in which
the data recording unit
generates the environment map, using semantic segmentation.

(13) An information processing method implemented in an information processing device, the information processing method including performing:
by a data processing unit,
a process of generating an environment map including type and layout information about an object in a real world, generating action analysis data of an action object that acts in the real world, and generating time/action/environment map correspondence data including the environment map and time-series data of the action analysis data;
a process of performing a machine learning process using the time/action/environment map correspondence data, and generating an action model having the environment map as an input value and a result of action estimation as an output value; and
a process of generating action control data for an agent, using the action model, the agent being a character in a virtual world or a robot.

(14) A program for information processing in an information processing device, the program causing a data processing unit to perform:
a process of generating an environment map including type and layout information about an object in a real world, generating action analysis data of an action object that acts in the real world, and generating time/action/environment map correspondence data including the environment map and time-series data of the action analysis data;
a process of performing a machine learning process using the time/action/environment map correspondence data, and generating an action model having the environment map as an input value and a result of action estimation as an output value; and
a process of generating action control data for an agent, using the action model, the agent being a character in a virtual world or a robot.

Further, the series of processes described in this specification can be performed by hardware, software, or a combination of hardware and software. When processes are performed by software, a program in which the process sequences are recorded may be installed into a memory incorporated into special-purpose hardware in a computer that executes the program, or may be installed into a general-purpose computer that can perform various kinds of processes and execute the program. For example, the program can be recorded beforehand into a recording medium. The program can be installed from a recording medium into a computer, or can be received via a network such as a local area network (LAN) or the Internet and be installed into a recording medium such as an internal hard disk.

Note that the various processes described in this specification may not be performed in chronological order according to the description, but may be performed in parallel or independently of one another depending on the processing capability of the device performing the processes or as necessary. Also, in this specification, a system is a logical assembly of a plurality of devices, and does not necessarily mean devices with respective components incorporated into the same housing.

INDUSTRIAL APPLICABILITY

As described above, with the configuration of an embodiment of the present disclosure, an agent such as a character in a virtual world or a robot in the real world can be made to perform actions by imitating actions of a human.

Specifically, for example, an environment map including type and layout information about objects in the real world is generated, actions of a person acting in the real world are analyzed, time/action/environment map correspondence data including the environment map and time-series data of action analysis data is generated, a learning process using the time/action/environment map correspondence data is performed, an action model having the environment map as an input value and a result of action estimation as an output value is generated, and action control data for a character in a virtual world or a robot is generated with the use of the action model. For example, an agent is made to perform an action by imitating an action of a human.

With this configuration, an agent such as a character in a virtual world or a robot in the real world can be made to perform actions by imitating actions of a human.

REFERENCE SIGNS LIST

100 Information processing device
110 Information acquisition unit
111 Camera
112 Microphone
113 Sensor
120 Data processing unit
121 Data recording unit
122 Action learning unit
123 Agent action generating unit
125 Storage unit
130 Output unit
131 Display unit
132 Sound output unit
501 CPU
502 ROM
503 RAM
504 Bus
505 Input/output interface
506 Input unit
507 Output unit
508 Storage unit
509 Communication unit
510 Drive
511 Removable medium

The invention claimed is:

1. An information processing device comprising:
  circuitry configured to:
    generate an environment map including type and layout information about an object in a real world;
    classify an action object movable in the real world into a first action object representing a learning-processing target or a second action object representing a non-learning-processing target;
    generate first action analysis data of the first action object and second action analysis data of the second action object;
    generate correspondence data representing correspondence among the environment map, first time-series data of the first action analysis data, and second time-series data of the second action analysis data;
    generate an action model by performing a machine learning process using the correspondence data, wherein the action model is capable of outputting, using the environment map as an input value, a result of action estimation as an output value; and
    generate action control data for an agent, using the action model, wherein the agent includes at least one of a virtual character or a physical robot.

2. The information processing device according to claim 1, wherein
  the action object includes a human, and
  the control data includes data for causing the agent to perform an action by imitating an action of the human.

3. The information processing device according to claim 1, wherein
  the circuitry is further configured to:
    receive an input of agent action space environment data including environment data of an action space of the agent;
    generate an agent action space environment map including type and layout information about an object in the agent action space; and
    generate action control data for the agent in the agent action space.

4. The information processing device according to claim 1, wherein
  the action circuitry generates the action model by learning actions including an interaction between the action object and a real object.

5. The information processing device according to claim 4, wherein
  the circuitry generates the action control data for the agent by estimating actions including an interaction between the agent and an object in an agent action space from the action model.

6. The information processing device according to claim 1, wherein correspondence data including the action analysis data of each of an action object that is a learning processing target and an action object that is not a learning processing target, and generates an action model having the environment map as an input value and a result of action estimation as an output value, and the agent includes a plurality of agents, and the circuitry generates the action control data including an interaction between the plurality of agents, using the action model.

7. The information processing device according to claim 1, wherein
  the circuitry is further configured to:
    output an unanalyzable action among actions of the action object as unanticipated action data; and
    generate the correspondence data formed only with action analysis data that does not include the unanticipated action data.

8. The information processing device according to claim 7, wherein
  the circuitry is further configured to:
    generate a result of action analysis of the unanticipated action data, using an algorithm capable of performing action analysis on the unanticipated action data,
    perform an update process on the correspondence data using the generated result of the action analysis of the unanticipated action data; and
    generate the correspondence data including the result of the action analysis of the unanticipated action data.

9. The information processing device according to claim 1, wherein
  the action control data includes control information for controlling an action of the virtual character in an augmented reality (AR) image.

10. The information processing device according to claim 1, wherein the action control data includes control information for controlling an action of the physical robot.

11. The information processing device according to claim 1, wherein
the circuitry is further configured to the environment map, using semantic segmentation.

12. An information processing method implemented in an information processing device, the information processing method comprising performing:
generating an environment map including type and layout information about an object in a real world;
classifying an action object movable in the real world into a first action object representing a learning-processing target or a second action object representing a non-learning-processing target;
generating first action analysis data of the first action object and second action analysis data of the second action object;
generating correspondence data representing correspondence among the environment map, first time-series data of the first action analysis data, and second time-series data of the second action analysis data;
generating an action model by performing a machine learning process using the correspondence data, wherein the action model is capable of outputting, using the environment map as an input value, a result of action estimation as an output value; and
generating action control data for an agent, using the action model, wherein the agent includes at least one of a virtual character or a physical robot.

13. A non-transitory computer-readable storage medium having embodied thereon a program, which when executed by an information processing device of a computer causes the computer to execute a method, the method comprising:
generating an environment map including type and layout information about an object in a real world;
classifying an action object movable in the real world into a first action object representing a learning-processing target or a second action object representing a non-learning-processing target;
generating first action analysis data of the first action object and second action analysis data of the second action object;
generating correspondence data representing correspondence among the environment map, first time-series data of the first action analysis data, and second time-series data of the second action analysis data;
generating an action model by performing a machine learning process using the correspondence data, wherein the action model is capable of outputting, using the environment map as an input value, a result of action estimation as an output value; and
generating action control data for an agent, using the action model, wherein the agent includes at least one of a virtual character or a physical robot.

* * * * *